US010657502B2

(12) United States Patent
Dheer et al.

(10) Patent No.: US 10,657,502 B2
(45) Date of Patent: May 19, 2020

(54) SYSTEMS AND METHODS FOR PERFORMING FINANCIAL TRANSACTIONS

(71) Applicant: FISERV, INC., Brookfield, WI (US)

(72) Inventors: Sanjeev Dheer, Scarsdale, NY (US); Michael Edward Martin, Lawrenceville, GA (US); William Richard McMichael, Cumming, GA (US); Mark T. Harris, Westerville, OH (US); Juan Carlos Miqueli, Suwanee, GA (US); Brian Corey Sondergaard, Suwanee, GA (US); David Michael Keenan, Wilmette, IL (US); Mark Edward Bowman, Canton, GA (US)

(73) Assignee: FISERV, INC., Brookfield, WI (US)

( * ) Notice: Subject to any disclaimer, the term of this patent is extended or adjusted under 35 U.S.C. 154(b) by 414 days.

(21) Appl. No.: 14/697,556

(22) Filed: Apr. 27, 2015

(65) Prior Publication Data

US 2015/0242823 A1    Aug. 27, 2015

Related U.S. Application Data

(63) Continuation of application No. 13/731,992, filed on Dec. 31, 2012, now abandoned.

(51) Int. Cl.
*G06Q 40/00* (2012.01)
*G06Q 20/02* (2012.01)
(Continued)

(52) U.S. Cl.
CPC .......... *G06Q 20/023* (2013.01); *G06Q 20/04* (2013.01); *G06Q 20/10* (2013.01); *G06Q 20/22* (2013.01)

(58) Field of Classification Search
CPC ...... G06Q 20/02; G06Q 20/023; G06Q 20/04; G06Q 20/102
See application file for complete search history.

(56) References Cited

U.S. PATENT DOCUMENTS 4,346,442 A    8/1982    Musmanno
4,649,563 A    3/1987    Riskin
(Continued)

FOREIGN PATENT DOCUMENTS

EP    0567291        7/2000
GB    2392262 A    2/2004
(Continued)

OTHER PUBLICATIONS

US 5,351,994 A, 10/1994, Pollin (withdrawn)
(Continued)

*Primary Examiner* — Bruce I Ebersman
*Assistant Examiner* — Mark H Gaw
(74) *Attorney, Agent, or Firm* — Alston & Bird LLP

(57) ABSTRACT

Systems, methods and computer-readable media for initiating, facilitating and/or performing financial transactions are disclosed. A request associated with a financial transaction may be received on behalf of a requestor. At least one financial account to be debited and at least one financial account to be credited in connection with the financial transaction may be identified based on information included or provided in association with the request. Respective payment networks that provide access to the financial accounts may be identified. One or more of the financial accounts may be accessible in real-time via a respective payment network. A respective debit or credit instruction may be transmitted to each of the identified payment networks to post a debit or credit to a corresponding financial account. Corresponding debit and/or credit status information may be received, and various status indications may be generated and transmitted, potentially for presentation to the requestor.

14 Claims, 14 Drawing Sheets

(51) Int. Cl.
  *G06Q 20/22* (2012.01)
  *G06Q 20/04* (2012.01)
  *G06Q 20/10* (2012.01)

(56) References Cited

U.S. PATENT DOCUMENTS

| | | |
|---|---|---|
| 4,694,397 A | 9/1987 | Grant et al. |
| 4,823,264 A | 4/1989 | Deming |
| 5,220,501 A | 6/1993 | Lawlor et al. |
| 5,383,113 A | 1/1995 | Kight et al. |
| 5,424,938 A | 6/1995 | Wagner et al. |
| 5,465,206 A * | 11/1995 | Hilt ........................ G06Q 20/02 |
| | | 705/40 |
| 5,481,720 A | 1/1996 | Loucks et al. |
| 5,504,677 A | 4/1996 | Pollin |
| 5,644,727 A | 7/1997 | Atkins |
| 5,696,902 A | 12/1997 | Leclercq et al. |
| 5,745,706 A | 4/1998 | Wolfberg et al. |
| 5,774,553 A | 6/1998 | Rosen |
| 5,787,427 A | 7/1998 | Benantar et al. |
| 5,805,719 A | 9/1998 | Pare, Jr. et al. |
| 5,826,243 A | 10/1998 | Musmanno et al. |
| 5,855,020 A | 12/1998 | Kirsch |
| 5,870,724 A | 2/1999 | Lawlor et al. |
| 5,884,285 A | 3/1999 | Atkins |
| 5,884,288 A | 3/1999 | Chang et al. |
| 5,893,078 A | 4/1999 | Paulson |
| 5,895,838 A | 4/1999 | Harjunmaa et al. |
| 5,940,809 A | 8/1999 | Musmanno et al. |
| 5,963,925 A | 10/1999 | Kolling et al. |
| 5,966,698 A | 10/1999 | Pollin |
| 5,974,146 A | 10/1999 | Randle et al. |
| 6,012,048 A | 1/2000 | Gustin et al. |
| 6,018,722 A | 1/2000 | Ray et al. |
| 6,038,603 A | 3/2000 | Joseph |
| 6,058,378 A | 5/2000 | Clark et al. |
| 6,108,641 A | 8/2000 | Kenna et al. |
| 6,108,788 A | 8/2000 | Moses et al. |
| 6,173,272 B1 | 1/2001 | Thomas et al. |
| 6,199,077 B1 | 3/2001 | Inala et al. |
| 6,226,623 B1 | 5/2001 | Schein et al. |
| 6,240,399 B1 | 5/2001 | Frank et al. |
| 6,292,789 B1 | 9/2001 | Schutzer |
| 6,304,860 B1 | 10/2001 | Martin et al. |
| 6,311,170 B1 | 10/2001 | Embrey |
| 6,317,783 B1 | 11/2001 | Freishtat et al. |
| 6,321,334 B1 | 11/2001 | Jerger et al. |
| 6,324,523 B1 | 11/2001 | Killeen, Jr. et al. |
| 6,374,231 B1 | 4/2002 | Bent et al. |
| 6,381,592 B1 | 4/2002 | Reuning |
| 6,385,595 B1 | 5/2002 | Kolling |
| 6,389,538 B1 | 5/2002 | Gruse et al. |
| 6,405,245 B1 | 6/2002 | Burson et al. |
| 6,412,073 B1 | 6/2002 | Rangan |
| 6,473,800 B1 | 10/2002 | Jerger et al. |
| 6,510,451 B2 | 1/2003 | Wu et al. |
| 6,513,019 B2 | 1/2003 | Lewis |
| 6,567,850 B1 | 5/2003 | Freishtat et al. |
| 6,594,766 B2 | 7/2003 | Rangan et al. |
| 6,598,028 B1 | 7/2003 | Sullivan et al. |
| 6,606,606 B2 | 8/2003 | Starr |
| 6,609,128 B1 | 8/2003 | Underwood |
| 6,633,910 B1 | 10/2003 | Rajan et al. |
| 6,658,568 B1 | 12/2003 | Ginter et al. |
| 6,697,860 B1 | 2/2004 | Kung |
| 6,721,716 B1 | 4/2004 | Gross |
| 6,792,082 B1 | 9/2004 | Levine |
| 6,799,167 B1 | 9/2004 | Gullen et al. |
| 6,802,042 B2 | 10/2004 | Rangan et al. |
| 6,826,542 B1 | 11/2004 | Virgin |
| 6,850,996 B2 | 2/2005 | Wagner |
| 6,922,673 B2 | 7/2005 | Karas et al. |
| 7,003,500 B1 | 2/2006 | Driessen |
| 7,013,310 B2 | 3/2006 | Messing et al. |
| 7,031,939 B1 | 4/2006 | Gallagher et al. |
| 7,089,208 B1 | 8/2006 | Levchin et al. |
| 7,120,608 B1 | 10/2006 | Gallagher et al. |
| 7,130,807 B1 | 10/2006 | Mikurak |
| 7,130,817 B2 | 10/2006 | Karas et al. |
| 7,146,338 B2 | 12/2006 | Kight et al. |
| 7,177,836 B1 | 2/2007 | German et al. |
| 7,191,151 B1 | 3/2007 | Nosek |
| 7,216,104 B2 | 5/2007 | Mason |
| 7,328,844 B2 | 2/2008 | Workens |
| 7,373,329 B2 | 5/2008 | Gallagher et al. |
| 7,376,587 B1 | 5/2008 | Neofytides |
| 7,383,223 B1 | 6/2008 | Dilip et al. |
| 7,430,537 B2 | 9/2008 | Templeton |
| 7,502,749 B2 | 3/2009 | Ganesan |
| 7,512,552 B2 | 3/2009 | Karas et al. |
| 7,562,037 B2 | 7/2009 | Wright |
| 7,587,342 B2 | 9/2009 | Neofytides et al. |
| 7,587,363 B2 | 9/2009 | Cataline et al. |
| 7,596,529 B2 | 9/2009 | Mascavage, III et al. |
| 7,606,734 B2 | 10/2009 | Baig et al. |
| 7,653,598 B1 | 1/2010 | Hamilton et al. |
| 7,676,431 B2 | 3/2010 | O'Leary et al. |
| 7,676,434 B2 | 3/2010 | Evans |
| 7,689,482 B2 | 3/2010 | Lam |
| 7,702,579 B2 | 4/2010 | Neely et al. |
| 7,747,523 B2 | 6/2010 | Cohen |
| 7,788,172 B2 | 8/2010 | Kight et al. |
| 7,809,615 B2 | 10/2010 | Hui |
| 7,953,663 B1 | 5/2011 | LeKachman |
| 7,995,118 B2 | 8/2011 | Rothschild |
| 8,041,646 B2 | 10/2011 | Bajan |
| 8,170,954 B2 | 5/2012 | Keresman et al. |
| 8,626,659 B1 | 1/2014 | Bowman et al. |
| 2002/0002536 A1 | 1/2002 | Braco |
| 2002/0010768 A1 | 1/2002 | Marks et al. |
| 2002/0019753 A1 | 2/2002 | Boden |
| 2002/0023215 A1 | 2/2002 | Ding et al. |
| 2002/0087461 A1 | 7/2002 | Ganesan et al. |
| 2002/0107767 A1 | 8/2002 | McClair et al. |
| 2002/0116331 A1 | 8/2002 | Cataline et al. |
| 2003/0097331 A1 | 5/2003 | Cohen |
| 2003/0154164 A1 | 8/2003 | Mascavage et al. |
| 2004/0019560 A1 | 1/2004 | Evans et al. |
| 2004/0059672 A1 | 3/2004 | Baig et al. |
| 2004/0107164 A1 | 6/2004 | Ghiloni et al. |
| 2004/0215560 A1 | 10/2004 | Amalraj et al. |
| 2005/0108155 A1 | 5/2005 | Gallagher et al. |
| 2005/0127165 A1 | 6/2005 | Currey |
| 2005/0131813 A1 | 6/2005 | Gallagher et al. |
| 2005/0154664 A1 * | 7/2005 | Guy ........................ G06Q 40/00 |
| | | 705/35 |
| 2006/0004670 A1 * | 1/2006 | McKenney ............ G06Q 20/02 |
| | | 705/64 |
| 2006/0015450 A1 | 1/2006 | Guck et al. |
| 2006/0020542 A1 | 1/2006 | Litle et al. |
| 2006/0059065 A1 | 3/2006 | Glinberg et al. |
| 2006/0195398 A1 | 8/2006 | Dheer et al. |
| 2006/0206419 A1 | 9/2006 | Rosti et al. |
| 2006/0242085 A1 | 10/2006 | Jones et al. |
| 2006/0253340 A1 | 11/2006 | Levchin |
| 2006/0265325 A1 | 11/2006 | Fajardo |
| 2007/0011099 A1 | 1/2007 | Sheehan |
| 2007/0061257 A1 | 3/2007 | Neofytides et al. |
| 2007/0094113 A1 | 4/2007 | Chapeta |
| 2007/0100748 A1 * | 5/2007 | Dheer ................... G06Q 20/40 |
| | | 705/39 |
| 2007/0192245 A1 | 8/2007 | Fisher et al. |
| 2007/0192249 A1 | 8/2007 | Biffle et al. |
| 2007/0198432 A1 * | 8/2007 | Pitroda ................. G06Q 20/02 |
| | | 705/64 |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro et al. |
| 2008/0005001 A1 | 1/2008 | Davis et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |

(56) References Cited

U.S. PATENT DOCUMENTS

| | | |
|---|---|---|
| 2008/0010215 A1 | 1/2008 | Rackley, III et al. |
| 2008/0046362 A1 | 2/2008 | Easterly |
| 2008/0126145 A1 | 5/2008 | Rackley, III et al. |
| 2008/0133403 A1 | 6/2008 | Hamzeh |
| 2008/0154772 A1 | 6/2008 | Carlson |
| 2008/0230600 A1* | 9/2008 | Black ............... G06Q 20/04 235/380 |
| 2008/0270246 A1 | 10/2008 | Chen |
| 2008/0288376 A1 | 11/2008 | Panthaki et al. |
| 2008/0288400 A1 | 11/2008 | Panthaki et al. |
| 2008/0301022 A1 | 12/2008 | Patel et al. |
| 2008/0312998 A1 | 12/2008 | Templeton |
| 2008/0319873 A1 | 12/2008 | Levchin et al. |
| 2008/0319874 A1 | 12/2008 | Levchin et al. |
| 2008/0319875 A1 | 12/2008 | Levchin et al. |
| 2008/0319899 A1 | 12/2008 | Levchin et al. |
| 2009/0024523 A1 | 1/2009 | Baig et al. |
| 2009/0094155 A1 | 4/2009 | Baig et al. |
| 2009/0106149 A1 | 4/2009 | Bennett et al. |
| 2009/0240622 A1 | 9/2009 | Zandonadi |
| 2009/0276359 A1 | 11/2009 | Panthaki et al. |
| 2009/0287599 A1 | 11/2009 | Lamar, III |
| 2009/0319410 A1 | 12/2009 | Kight et al. |
| 2010/0030687 A1 | 2/2010 | Panthaki et al. |
| 2010/0042538 A1 | 2/2010 | Dheer et al. |
| 2010/0042539 A1 | 2/2010 | Dheer et al. |
| 2011/0196790 A1 | 8/2011 | Milne |
| 2011/0320347 A1 | 12/2011 | Tumminaro et al. |
| 2012/0084205 A1 | 4/2012 | Dheer et al. |
| 2012/0136781 A1 | 5/2012 | Fridman et al. |
| 2012/0151515 A1 | 6/2012 | Atsmon et al. |
| 2012/0173409 A1 | 7/2012 | Hu |
| 2012/0173422 A1 | 7/2012 | Hu |
| 2012/0239559 A1 | 9/2012 | O'Leary et al. |
| 2012/0323762 A1 | 12/2012 | Kapur et al. |
| 2013/0103577 A1 | 4/2013 | Lawson |
| 2013/0246274 A1 | 9/2013 | Marcous et al. |
| 2014/0032391 A1 | 1/2014 | Kapur et al. |
| 2014/0032407 A1 | 1/2014 | Kapur et al. |
| 2014/0067670 A1 | 3/2014 | Dheer et al. |
| 2014/0067672 A1 | 3/2014 | Dheer et al. |
| 2014/0074724 A1 | 3/2014 | Gordon et al. |
| 2014/0089169 A1 | 3/2014 | Kapur et al. |
| 2014/0089205 A1 | 3/2014 | Kapur et al. |
| 2014/0108239 A1 | 4/2014 | Bowman et al. |
| 2015/0142663 A1 | 5/2015 | Lawson et al. |
| 2015/0154570 A1 | 6/2015 | Dheer et al. |
| 2015/0199670 A1 | 7/2015 | Dheer et al. |
| 2015/0242826 A1 | 8/2015 | Dheer et al. |

FOREIGN PATENT DOCUMENTS

| | | |
|---|---|---|
| JP | 10149404 A | 2/1998 |
| WO | 9719406 | 5/1997 |
| WO | 0188674 A2 | 11/2001 |

OTHER PUBLICATIONS

University of Missouri—St. Louis (Transaction Processing and Management Reporting Systems, https://web.archive.org/web/20100613022200/http://www.umsl.edu/~joshik/msis480/chapt09.htm Chapter 9, Jun. 2010) (Year: 2010).*

Sposito, Sean, "Dwolla Pitches Fast Fund Transfers, but Bank Participation is Vital," American Banker, May 8, 2012, 2 pgs.

Quittner, Jeremy, "Dwolla's Speedy Alternative to ACH," American Banker, Oct. 1, 2012.

"Faster Payments Managed Service," VocaLink website, Factsheet, 2012.

"Multi-Channel Gateway," VocaLink website, 2012.

"VocaLink partners with Clairmail to offer innovative real-time banking solutions through the mobile channel," VocaLink website, Press Releases 2012, Mar. 13, 2012.

Schneier Bruce "Applied Cryptography Protocols Algorithms and Source Code in C" 1996 pp. 30-32 Second Edition John Wiley & Sons Inc.

Dartmouth Research & Consulting Glossaries Banking Glossary 2000 pp. 1-11.

Latest EPA Developments PR Newswire Jul. 21 2001 7 pgs. New York.

International Search Report for related International Application No. PCT/US2009/31602 dated Mar. 9 2009.

Written Opinion of the International Searching Authority for related International Application No. PCT/US2009/31602 dated Mar. 9, 2009.

"Zions Bancorporation Selects CheckFree's PEP+ Platinum Suite to Enhance ACH Processing," Aug. 23, 2007; PR Newswire.

"Fiserv, Inc.; Fiserv Makes ACH Processing Easier and Less Expensive," Apr. 25, 2009; Real Estate & Investment Week.

Bruno-Britz, Maria, "Fiserv Releases New PEP+ Module for NOCs," Sep. 10, 2009; Bank Systems & Technology.

"CheckFree Supports ACH Globization with PEP+ Software Platform," Nov. 3, 2003; PR Newswire.

* cited by examiner

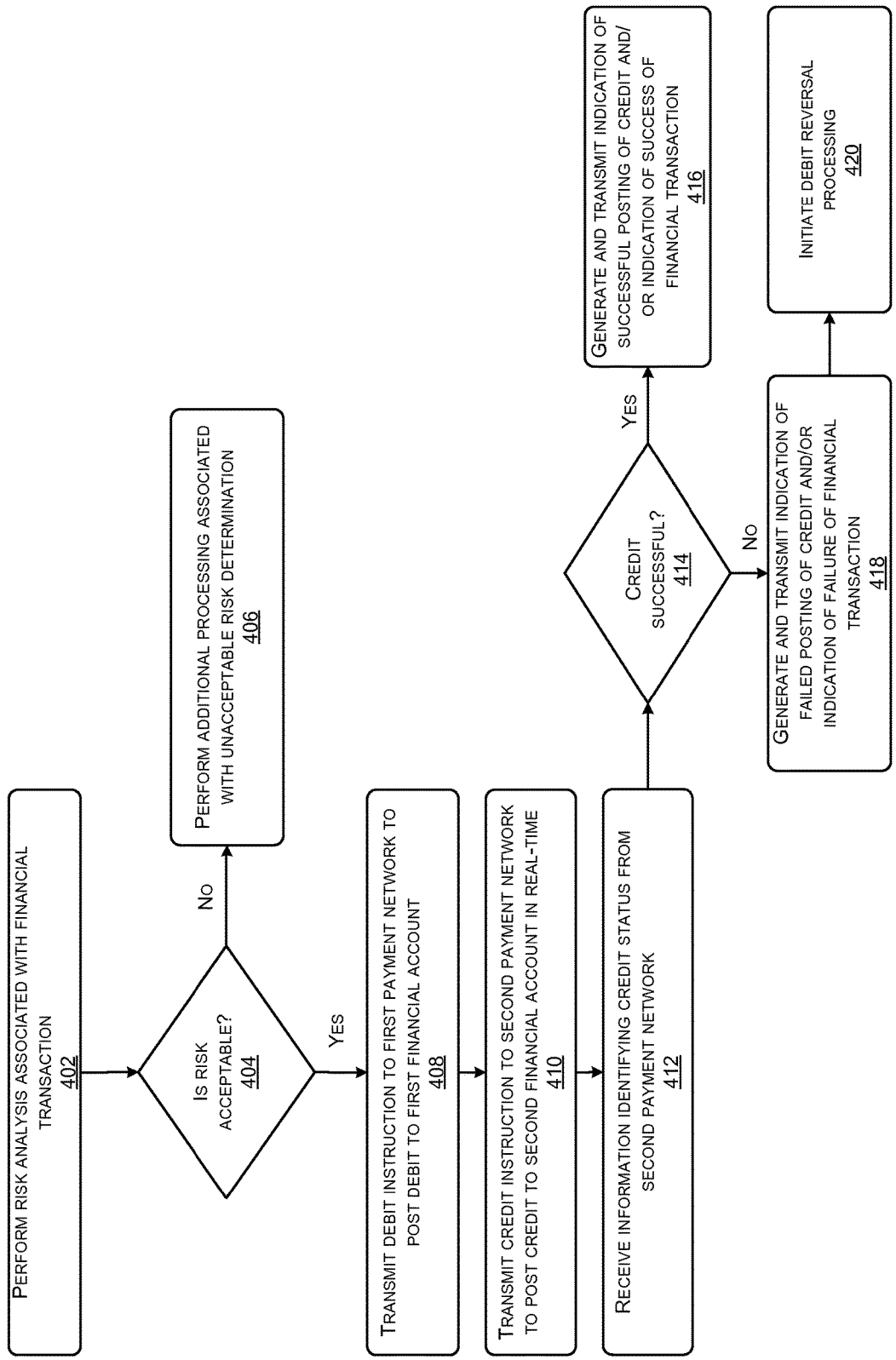

SYSTEMS AND METHODS FOR PERFORMING FINANCIAL TRANSACTIONS

CROSS-REFERENCE TO RELATED APPLICATION(S)

This application is a continuation of U.S. application Ser. No. 13/731,992, filed Dec. 31, 2012, the content of which is incorporated by reference herein in its entirety.

BACKGROUND

Various payment networks exist for facilitating access to financial accounts in connection with the processing of financial transactions. Examples of such payment networks include an Automated Clearinghouse (ACH) network, proprietary networks of financial institutions, debit networks, credit networks, and so forth.

BRIEF DESCRIPTION OF THE DRAWINGS

The detailed description is set forth with reference to the accompanying drawings. The use of the same reference numerals indicates similar or identical items; however, different reference numerals may be used to indicate similar or identical items as well. Various embodiments may utilize element(s) and/or component(s) other than those illustrated in the drawings and some element(s) and/or component(s) may not be present in various embodiments. It should be appreciated that while singular terminology may be used to describe a component or element, a plural number of such components or elements may also be encompassed within the scope of the disclosure.

FIG. 4 is a process flow diagram depicting an illustrative method for initiating, facilitating, and/or performing processing of a financial transaction in which a financial account to be debited is not accessible in real-time and a financial account to be credited is accessible in real-time in accordance with one or more embodiments of the disclosure.

DETAILED DESCRIPTION

Illustrative Architectures

Figure 1A:
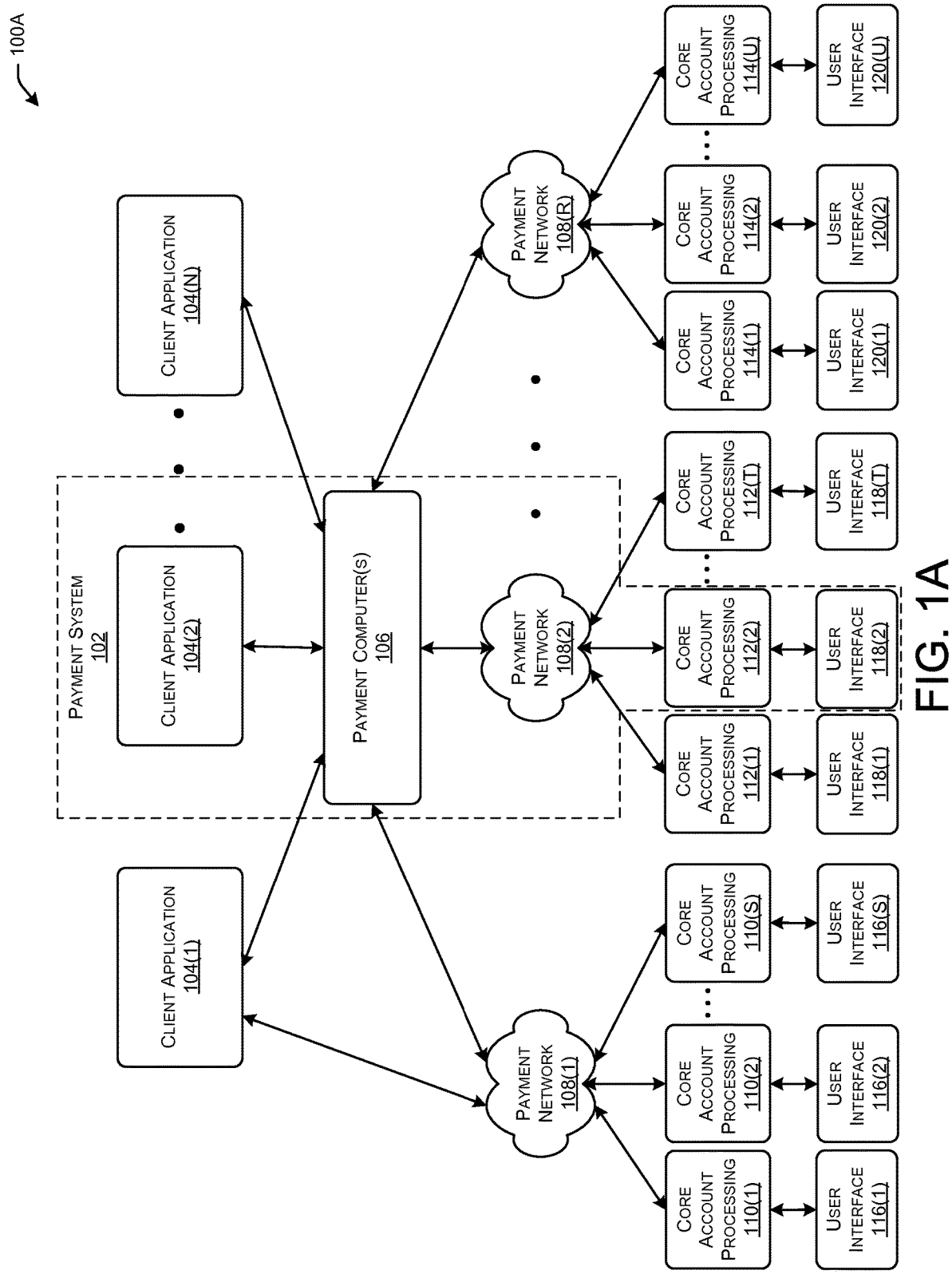
FIG. 1A is a schematic block diagram of an illustrative networked architecture for initiating, facilitating, and/or performing processing of one or more sides of a financial transaction in real-time in accordance with one or more embodiments of the disclosure.

Embodiments of the disclosure relate to, among other things, systems, methods, and computer-readable media for initiating, facilitating, and/or performing financial transactions in which one or more financial accounts are accessed in real-time. As used herein, a financial account may be accessible in "real-time" via a payment network if a result of an instruction transmitted to the payment network to post a debit or a credit to the financial account is known to a requesting client application prior to termination of the client application. In certain embodiments, "real-time" accessibility of a financial account may also refer to a capability to access a financial account during a communication session established with a requesting client application and have a debit or credit of funds posted to the financial account prior to termination of the communication session. A requesting client application may refer to a client application via which a requestor may submit a request associated with a financial transaction. In various embodiments, the term "real-time" may further refer to an immediate (e.g., in-session) availability for use of at least a portion of the credited funds and/or an in-session indication of availability for use of at least a portion of the credited funds. The term "real-time" may further refer to an immediate lack of availability for use of at least a portion of the debited funds and/or an in-session indication of lack of availability of at least a portion of the debited funds.

In accordance with one or more embodiments of the disclosure, a financial transaction may include any transaction in which funds are transferred from one financial account to one or more other financial accounts. The financial accounts between which the funds are transferred may be associated with a same account holder or different account holders and may be held at a same financial institution or at different financial institutions. In various embodiments, the financial transaction may be associated with any one of: (i) a bill payment, (ii) a person-to-person payment, (iii) a retail payment, (iv) an account-to-account transfer, (v) a financial account opening, or (vi) a check deposit.

It should be appreciated that the foregoing is not an exhaustive list of types of financial transactions to which systems and methods of the disclosure may be applicable, and that any financial transaction involving the exchange of value between any two or more value holding entities is within the scope of this disclosure. It should further be appreciated that while various embodiments of the disclosure may be described through reference to a funds amount that is debited from a first financial account and credited to a second financial account, numerous other embodiments are within the scope of the disclosure. For example, in various embodiments, a respective portion of funds debited from a first financial account may be credited to each of multiple other financial accounts as part of a same financial transaction, respective funds debited from multiple financial accounts may be collectively credited to a single financial account as part of a single credit, and so forth.

As previously noted, a financial transaction may involve the debiting of funds from a first financial account and a crediting of a respective portion of the debited funds to one or more other financial accounts. The financial accounts may include any combination of: (i) a demand deposit account, (ii) a savings account, (iii) a money market account, (iv) a line of credit account, (v) a debit card account, (vi) a credit card account, (vii) a prepaid card account, (viii) a stored value account, or (ix) a brokerage account. It should be appreciated that the foregoing is not an exhaustive list of financial accounts to which systems and methods of the disclosure may be applicable.

FIG. 1A schematically depicts an illustrative networked architecture 100A for initiating, facilitating and/or performing processing of one or more sides of a financial transaction in real-time in accordance with one or more embodiments of the disclosure. One or more sides of a financial transaction may include a debit component and/or a credit component of a financial transaction. The architecture 100A may include a payment system 102 that may include one or more payment computers 106. The payment system 102 may be associated with one or more payment service providers. The payment computers 106 may include any suitable processor-driven devices including, but not limited to, a server device, a mainframe computing device, a workstation computing device, a personal computing device, and so forth. The payment computers 106 may include at least one memory storing computer-executable instructions and at least one processor configured to access the at least one memory and to execute the computer-executable instructions to perform or facilitate the performance of various operations associated with the receipt of requests associated with financial transactions, the transmission of debit and credit instructions associated with the financial transactions, the receipt and transmission of various messages, and so forth. Various hardware and software components of the payment computers 106 will be described in greater detail through reference to FIG. 3.

Although the payment system 102 is illustratively depicted in FIG. 1A as a single system, it should be appreciated that the payment system 102 may comprise an architecture that includes multiple independent system(s) and/or payment gateways capable of communicating among one another to facilitate the processing of financial transactions. Further, components other than the payment computer(s) 106 may also form part of the payment system 102.

The illustrative architecture 100A may further include one or more client applications 104(1)-104(N). The variable N may represent any non-negative integer. The client applications 104(1)-104(N) may include any client products or services capable of leveraging functionality provided by the payment computers 106. Any of the client applications 104(1)-104(N) may be integrated with one or more other client applications 104(1)-104(N), or with other client application(s) that may not share the same connectivity to the payment computers 106 (e.g. wealth management applications, financial data aggregation applications, personal financial management applications, etc.). The client applications 104(1)-104(N) may have any of a variety of forms including, but not limited to, traditional stand-alone applications executing on a computing device (e.g., a personal computer), web-based applications accessible via a traditional browser or mobile browser-rendered interface, dedicated applications executing on a mobile device such as a smartphone or tablet device, or toolkits (e.g., Application Programming Interfaces (APIs), software libraries, etc.) that may be used in the context of another client application to access functionality provided by the payment computers 106.

The client applications 104(1)-104(N) may support a variety of types of financial transactions. For example, one or more of the client applications 104(1)-104(N) may support person-to-person (P2P) payment functionality in which a user may request a transfer of funds from a financial account associated with the user to a financial account associated with another user. P2P client applications may also support functionality that allows a user to submit a request to request a transfer of funds to a financial account associated with the user from a financial account associated with another user. The request for a transfer of funds and/or the request to request a transfer of funds may respectively include a target identifier or a source identifier (e.g., an electronic mail address, phone number, social network identifier, etc.) that may be used to identify a financial account associated with a user and/or to contact a user.

In various embodiments, the user identified by the target identifier or the source identifier may not be a registered user of the P2P client application, in which case, an invitation to register may be transmitted to the target identifier or the source identifier. Upon registration of the recipient of the invitation to register, processing of the financial transaction may continue. In the case of a request for a transfer of funds, the target identifier may be included in the request and may be associated with an account holder of a financial account to which funds are to be credited. In the case of a request to request a transfer of funds, the source identifier may be included in the request and may be associated with an account holder of a financial account from which funds are to be debited. In various embodiments, the target identifier or the source identifier may be used to identify an associated individual, and a different contact identifier may be identified (via a datastore lookup for example) and used to transmit communications (e.g., the invitation to register) to the identified individual.

In addition, one or more of the client applications 104(1)-104(N) may support functionality that allows for the processing of financial transactions between financial accounts associated with a same account holder (e.g., a transfer of funds between financial accounts associated with a same account holder that does not involve another party) which may be referred to herein as an account-to-account transfer. In various embodiments, the requestor may be a same entity as the account holder of the financial accounts between which the funds are transferred while, in other embodiments, the requestor may be a different entity from the account holder, but may be authorized to initiate the transaction.

In addition, one or more of the client applications 104(1)-104(N) may support online opening and, optionally, funding of a financial account at a financial institution. Typically, financial institution rules specify that a new financial account must be funded with a minimum deposit at the time the account is opened. Accordingly, such client applications may support a transfer of funds to the newly opened account from another financial account that may be held at the same financial institution or at a different financial institution.

Further, one or more of the client applications 104(1)-104(N) may support bill presentment and payment functionality. Such client applications may support electronic presentment of a bill and/or payment of a payee. The payee, while typically a biller, may be any entity. In those embodiments in which the payee is a "managed electronic payee" (e.g., an electronic biller, other large payees, etc.), funds may be electronically transferred to a known account associated with the payee or via a known electronic remittance path.

Additionally, one or more of the client applications 104(1)-104(N) may support various types of deposit capture functionality. Deposit capture functionality may encompass the electronic capture and deposit of paper payment instruments through various mechanisms. Examples of deposit capture functionality that may be supported include deposit capture for consumers via either a personal computer or a mobile device, deposit capture performed by merchants, processing of incoming checks performed by a financial institution or a lockbox processor, and so forth. Deposit capture functionality may be provided that supports the capture (e.g., remote capture) and processing or redemption in some manner by a financial institution of a payment instrument that may be drawn on a financial account held at a same financial institution or at a different financial institution.

In addition, one or more of the client applications 104(1)-104(N) may support any number of other types of transaction processing. For example, a retail or point-of-sale (POS) payment to a merchant for purchased goods or services may be supported, a "check guarantee" function or a similar funds sufficiency verification that a particular financial account has sufficient funds associated therewith to support a financial transaction may be supported, and so forth. Further, one or more of any of the types of client applications discussed above may provide an Application Programming Interface (API) such as, for example, a set of well-documented Web services that allows an entity to develop a user interface that accesses functionality provided by another entity.

The illustrative architecture 100A may further include one or more payment networks 108(1)-108(R). The variable R may represent any non-negative integer. The payment networks 108(1)-108(R) may include any network capable of facilitating and/or performing financial transaction processing for financial institutions that are members of the network. The payment networks 108(1)-108(R) may include one or more payment networks that are capable of supporting real-time posting of debits and credits to financial accounts and, optionally, one or more payment networks that are not capable of supporting real-time posting of debits and credits. The payment networks 108(1)-108(R) may include any of an Automated Clearing House (ACH) network, such as that supported by the Federal Reserve or the Electronic Payments Network (EPN), a proprietary network of financial institutions, a real-time settlement network, a debit network, a credit network, or any other suitable payment network capable of facilitating and/or processing financial transactions between member financial institutions or between member financial institutions and non-member financial institutions.

Each of the payment networks 108(1)-108(R) may support a respective communicative link to the payment computers 106 and another set of communicative links to respective core account processing systems 110(1)-110(S), 112(1)-112(T), 114(1)-114(U) that may be associated with, for example, respective financial institutions. More specifically, each of the core account processing systems 110(1)-110(S), each of the core account processing systems 112(1)-112(T), and each of the core account processing systems 114(1)-114(U) may be associated with a respective financial institution. The variables S, T and U may each represent respective non-negative integers. It should be appreciated that while elements 110(1)-110(S), 112(1)-112(T), 114(1)-114(U) may be referred to herein as core account processing systems, any combination of hardware and software capable of providing core account processing functionality is encompassed.

In accordance with one or more embodiments of the disclosure, a financial institution may be communicatively linked to multiple different payment networks (e.g., an ACH network, a proprietary financial institution network, a debit network, etc.) such that financial accounts held at the financial institution may be accessed via the different payment networks. Respective modules associated with each of the payment networks may be integrated with a common core account processing system associated with the financial institution to support communication between the different payment networks and the core account processing system.

For example, as will be described in more detail through reference to FIG. 1C, a payment processing module, or more specifically, a respective instance of a payment processing module may be provided at each financial institution of a group of one or more financial institutions. In certain embodiments, the payment processing module may form at least part of PEP+®—a payment processing platform provided by Fiserv® that enables the origination and receipt of financial transactions through an ACH network. Each financial institution at which the payment processing module is provided may form part of a network of financial institutions. Although the payment processing module may be described herein as being provided at a financial institution, it should be appreciated that, in various embodiments, the payment processing module may be provided remotely from a financial institution and may be hosted by the financial institution or by a third-party service provider on behalf of the financial institution. However, in certain embodiments, even though the payment processing module may be physically hosted remotely from a financial institution, it may be thought of as being logically provided at the financial institution. Accordingly, as used herein, any discussion of the payment processing module as being provided at a financial institution is intended to encompass any of the scenarios described above.

The payment processing module may include a network interaction component and an integration component. The network interaction component may be communicatively linked to the payment system 102 so as to enable the payment system 102 to access, in real-time, financial account(s) at each financial institution at which the payment processing module is provided. More specifically, the network interaction component may be communicatively linked to the integration component which may, in turn, be communicatively linked to a core account processing system at a financial institution. Accordingly, the network interaction component may facilitate real-time access of a financial account by the payment system 102 via the integration component's communicative link to a core account processing system of the financial institution with which the financial account is associated.

The payment system 102 may include one or more datastore(s) storing information relating to financial accounts and associated identifiers (e.g., identifiers associated with financial account holders and/or identifiers associated with financial accounts). The payment computer(s) 106 may be configured to access the datastore(s) to retrieve, based at least in part on information included in a financial transaction request, identifying information that identifies financial accounts and payment networks via which the accounts are accessible. Additionally, or alternatively, the payment computer(s) 106 may be configured to communicate a request for such identifying information to a service such as a Web service. In various embodiments, it may be determined that a particular financial account associated with a financial transaction request is accessible via an instance of the payment processing module associated with a financial institution at which the financial account is held. In such embodiments, the payment computer(s) 106 (or another device such as a switch or router) may communicate to the payment processing module, or more specifically the network interaction component of the payment processing module, a debit or credit instruction to post a debit or credit, as appropriate, to the financial account. Accordingly, in various embodiments, the payment system 102 may be thought of as being formed, at least in part, of the payment processing modules that are associated with various financial institutions and which include respective network interaction components that are configured to interact with the payment computer(s) 106 and/or additional devices such as router(s), switch(es), and so forth in order to enable real-time access to financial accounts.

The illustrative architecture 100A may further include user interfaces (UIs) 116(1)-116(S), 118(1)-118(T), 120(1)-120(U) for presenting financial account or transaction details associated with respective financial accounts to associated account holders or other users. The UIs 116(1)-116(S), 118(1)-118(T), 120(1)-120(U) may be in communication with respective ones of the core account processing systems in order to obtain the financial account or transaction details for presentation to the account holders or other users. While the UIs 116(1)-116(S), 118(1)-118(T), 120(1)-120(U) are depicted as being associated in a one-to-one correspondence with the core account processing systems 110(1)-110(S), 112(1)-112(T), 114(1)-114(U) in FIG. 1A, it should be appreciated that, in various embodiments, at least one of the core account processing systems may have a plurality of UIs associated therewith.

As an illustrative example, payment network 108(1) may support the processing of financial transactions between financial institutions that are members of the payment network 108(1) as well as, potentially, between member financial institutions and non-member financial institutions. Payment network 108(1) may be any of the types of payment networks previously described, and may or may not be capable of supporting real-time access to financial accounts held at member financial institutions (e.g. real-time posting of debits and credits to financial accounts held at member financial institutions). Payment network 108(1) may support a communicative link to the payment computers 106 and another set of communicative links to respective core account processing systems 110(1)-110(S) respectively associated with member financial institutions. More specifically, each of the core account processing systems 110(1)-110(S) may be associated with a respective member financial institution. In accordance with various embodiments of the disclosure, the payment computer(s) 106 may transmit debit and/or credit instructions to the payment network 108(1) to post associated debits and/or credits to financial accounts held at member financial institutions. The payment network 108(1) may interact with one or more of the core account processing systems 110(1)-110(S) to post debits and/or credits to corresponding financial accounts held at financial institutions with which the core account processing systems 110(1)-110(S) are associated.

The debits and/or credits may or may not be posted in real-time to associated financial accounts held at financial institutions that are members of the payment network 108(1). Whether a real-time debit or credit is capable of being posted to a particular financial account may be determined based on one or more parameters associated with the financial account, the financial institution at which the financial account is held, and/or the payment network to which a corresponding debit or credit instruction is transmitted. While the description above has been presented illustratively with respect to payment network 108(1), it should be appreciated that it is equally applicable to any of the payment networks 108(1)-108(R), any of the associated core account processing systems 110(1)-110(S), 112(1)-112(T), 114(1)-114(U), and any of the associated UIs 116(1)-116(S), 118(1)-118(T), 120(1)-120(U).

In various embodiments, the payment computers 106 may provide functionality that forms part of a middle application layer of functionality between the client applications 104(1)-104(N) and the payment networks 108(1)-108(R) that provide access to financial accounts. In such embodiments, the payment system 102 may further include one or more of the client applications 104(1)-104(N) (e.g., client application 104(2)) that provide users with access to the functionality provided by the payment computers 106. Further, in various embodiments, one or more of the payment networks 108(1)-108(R) (e.g., payment network 108(2)) may form part of the payment system 102 and may, for example, correspond to a proprietary payment network associated with a service provider with which the payment system 102 is associated. In other embodiments, each of the client applications 104(1)-104(N) may be provided as stand-alone applications that are distinct from but capable of interacting with the payment system 102 and providing access to the functionality offered by the payment system 102. Further, in various embodiments, each of the payment networks 108(1)-108(R) may operate independently of the payment system 102, but may provide the payment system 102 with access to financial accounts held at various financial institutions that are members of the payment network. In various embodiments, one or more of the core account processing systems (e.g., core account processing system 112(2)) and one or more of the UIs (e.g., UI 118(2)) may also form part of the payment system 102.

In various embodiments, one or more of the client applications 104(1)-104(N) may be capable of communicating with one or more respective payment networks independently of the payment system 102. For example, a payment network (e.g., payment network 108(1)) may support a set of communicative links that allow one or more of the client applications (e.g., 104(1)) to communicate with the payment network 108(1) independently of the payment system 102 through, for example, pre-existing payment gateways.

Accordingly, in various embodiments, the payment system 102 may provide functionality for supporting a mixed-mode financial transaction. As used herein, a mixed-mode transaction may refer to a financial transaction in which either the debit or credit component of the transaction is processed through a payment processing infrastructure that does not include the payment system 102. As a non-limiting example, a mixed-mode financial transaction may involve generation and transmission of a debit instruction or a credit instruction to a payment network (e.g., payment network 108(1)) through an established payment processing infrastructure that may include one or more payment gateways and/or payment systems that do not form part of the payment system 102. Although the payment network 108(1) is illustratively depicted in FIG. 1A as supporting a set of one or more communicative links with the client application 104(1) that does not include the payment system 102, it should be appreciated that this is merely an illustrative depiction and that any of the payment networks 108(1)-108(R) may support processing of financial transactions requested by any of the client applications 104(1)-104(N) independently of the payment system 102. Further, although the client application 104(1) is illustratively depicted as directly interacting with the payment network 108(1), it should be appreciated that a client application may interact with a payment network through one or more intervening payment gateways independently of the payment system 102.

Figure 1B:
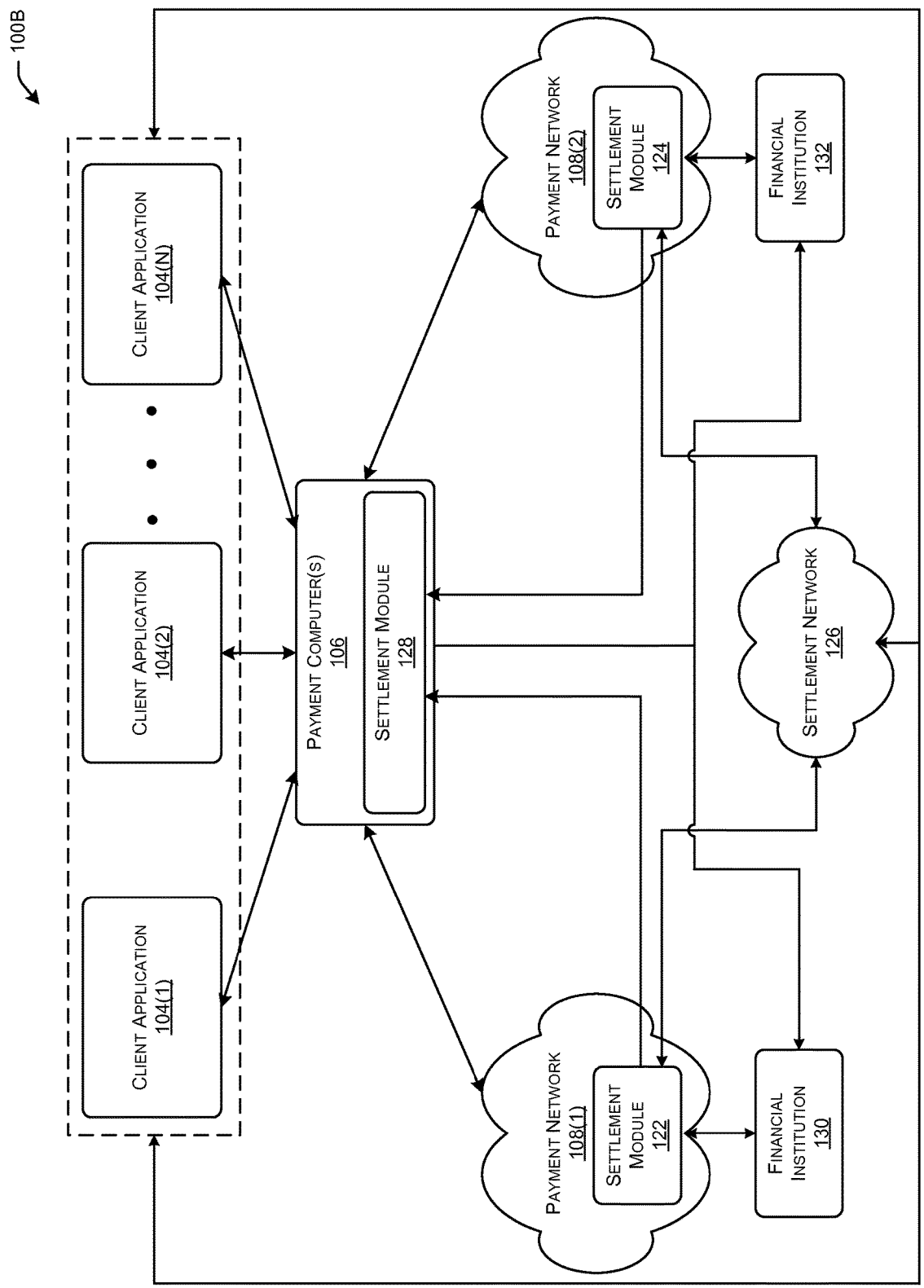
FIG. 1B is a schematic block diagram of an illustrative networked architecture for initiating, facilitating, and/or performing processing of one or more sides of a financial transaction in real-time and for facilitating and/or performing funds settlement associated with the financial transaction in accordance with one or more embodiments of the disclosure.

Various illustrative embodiments of the disclosure will now be described with respect to FIGS. 1B-10. FIG. 1B schematically depicts an illustrative networked architecture 100B for initiating, facilitating, and/or performing processing of one or more sides of a financial transaction in real-time and for performing funds settlement associated with the financial transaction in accordance with one or more embodiments of the disclosure.

In FIG. 1B, payment networks 108(1) and 108(2) are illustratively shown for the sake of simplicity. However, it should be appreciated that various embodiments of the disclosure described herein are applicable to any number or type of payment networks. The payment computer(s) 106 are communicatively linked to each of the payment networks 108(1) and 108(2), and are further communicatively linked to the one or more client applications 104(1)-104(N). The payment networks 108(1) and 108(2) may provide the payment computer(s) 106 with access to financial accounts held at financial institution 130 and financial institution 132, respectively. Although depicted in abstracted form, it should be appreciated that each of the financial institution 130 and the financial institution 132 may have associated therewith one or more respective core account processing systems, respective financial accounts, one or more respective UIs for presenting account holders and other users with financial account and transaction information, and so forth.

Settlement modules 122 and 124 may be respectively associated with the payment networks 108(1) and 108(2). The settlement modules 122 and 124 may be capable of interacting with a settlement network 126 (e.g., an ACH network) and may be further capable of interacting with a settlement module 128 provided in association with the payment computer(s) 106. Although the settlement modules 122, 124 are depicted as forming part of the payment networks 108(1), 108(2), respectively, it should be appreciated that the settlement modules 122, 124 may instead be respectively provided at the financial institutions 130, 132, and may be in communication with the settlement module 128 via the payment networks 108(1), 108(2), respectively.

As part of a requested financial transaction, funds may be debited from a first financial account held at financial institution 130 and at least a portion of the debited funds may be credited to a second financial account held at financial institution 132. It should be appreciated that the above scenario is presented simply for explanatory purposes and that any number of other scenarios are within the scope of the disclosure. Various embodiments for initiating, facilitating, and/or performing various financial transactions in which a first financial account to be debited and/or a second financial account to be credited are accessible in real-time via respective payment networks will be described in greater detail through reference to FIGS. 3A-10.

Still referring to FIG. 1B, debiting the first financial account may involve movement of funds from the first financial account to an intermediary holding account associated with the financial institution 130 and/or with the payment network 108(1). The settlement module 122 may include any combination of hardware and/or software to facilitate the movement of funds to the intermediary holding account. Similarly, crediting of the second financial account held at the financial institution 132 may involve movement of funds from an intermediary account associated with the second financial institution 132 and/or the payment network 108(2) to the second financial account.

Settlement of funds may then occur between the respective intermediary accounts associated with the financial institution 130 and the financial institution 132 via, for example, settlement network 126. Settlement network 126 may be a non-real-time settlement network such as, for example, an ACH network. Alternatively, settlement may be facilitated in real-time by the settlement module 128 associated with the payment computer(s) 106. For example, settlement module 122 may facilitate the transfer of funds from the intermediary account associated with financial institution 130 to a holding account associated with the payment system 102 (which the payment computer(s) 106 may form part of). The settlement module 128 may then facilitate transfer of the received funds from the holding account to the intermediary account associated with the financial institution 132. Alternatively, the settlement module 128 may facilitate transfer of funds in real-time to the intermediary account associated with the financial institution 132 and may perform later settlement with the financial institution 130 via, for example, the settlement network 126. The settlement network 126 may also facilitate settlement between one or more of the client applications 104(1)-104(N) and one or more holding accounts and/or one or more "bookkeeping" accounts associated with the payment system 102. A bookkeeping account may refer to a distinct logical entity for partitioning settlement funds but which may not correspond to a holding account in actuality. As a result of such connectivity, the payment system 102 may support settlement functionality for mixed-mode transactions in which a debit component or a credit component of the transaction is not processed through the payment system 102.

It should be appreciated that multiple respective intermediary holding accounts may be associated with the financial institution 130 and/or the financial institution 132. It should further be appreciated that multiple holding accounts may be associated with the payment system 102 for facilitating settlement of funds between financial institutions. For example, a respective holding account may be provided for each of the client applications 104(1)-104(N). Further, in various embodiments, a respective holding account may be provided for each of the payment networks (e.g., payment network 108(1) and payment network 108(2)). It should be appreciated that settlement may be performed according to any suitable real-time or non-real-time mechanism in accordance with various embodiments of the disclosure. Further, settlement may occur on a per-transaction basis or via a net-settlement mechanism in which the debit of the first financial account held at financial institution 130 and the credit of the second financial account held at financial institution 132 may be grouped with other debits and credits involving financial accounts held at the financial institutions 130, 132 and processed asynchronously (e.g. via a batch processing mechanism).

Figure 1C:
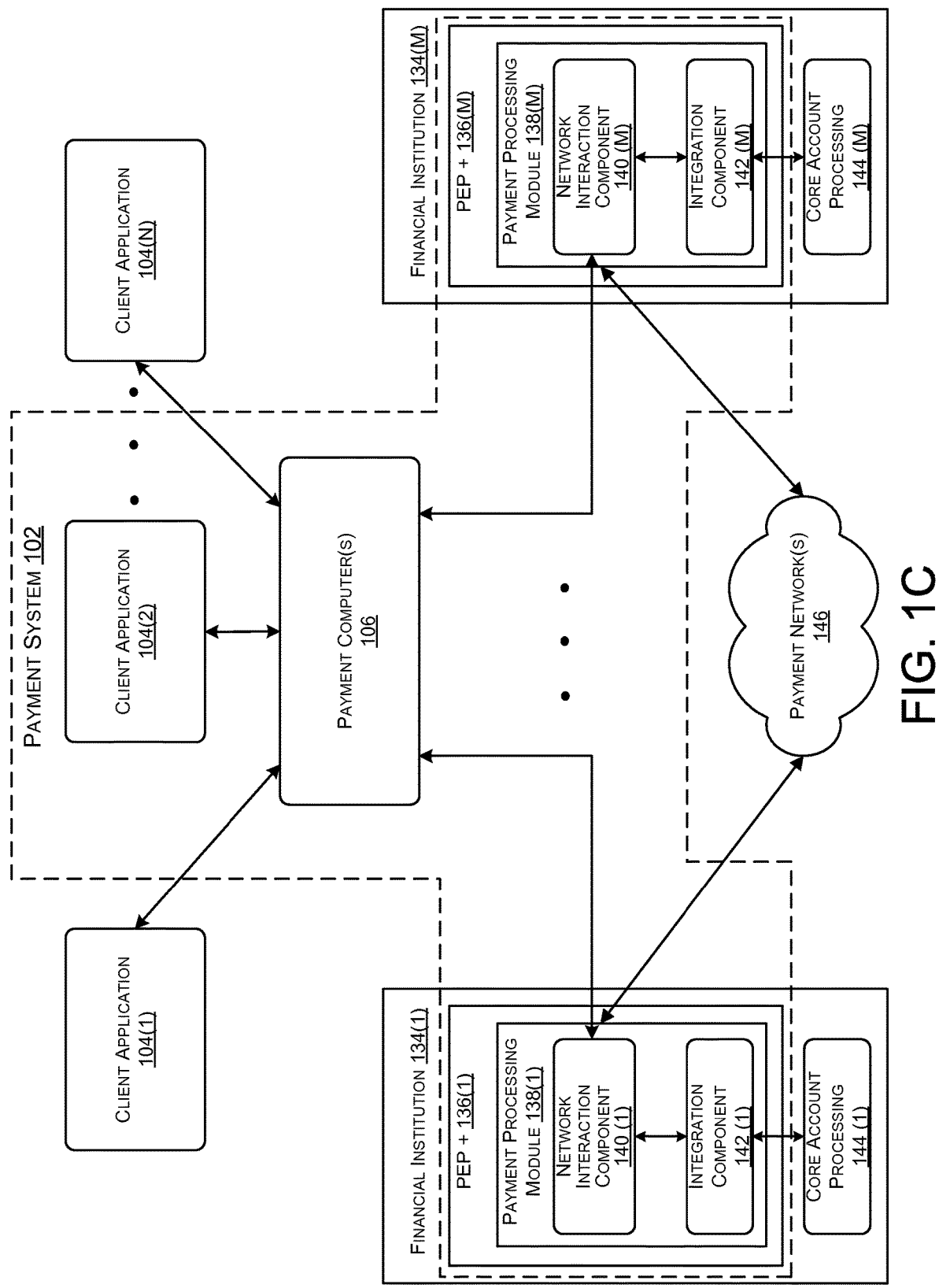
FIG. 1C is a schematic block diagram of an illustrative networked architecture that includes a payment processing module provided at each financial institution of a group of financial institutions and that is configured to enable the processing of one or more sides of a financial transaction in real-time in accordance with one or more embodiments of the disclosure.

FIG. 1C is a schematic block diagram of an illustrative networked architecture 100C that includes a payment processing module provided at each financial institution of a group of financial institutions and that is configured to enable the processing of one or more sides of a financial transaction in real-time in accordance with one or more embodiments of the disclosure.

The illustrative networked architecture 100C may include the payment system 102 which may include the one or more payment computers 106. In certain embodiments, the payment system 102 and the payment computer(s) 106 may form part of the networked architecture 100C in addition to forming part of the networked architecture 100A and/or the networked architecture 100B. In other embodiments, the payment system 102 and the payment computer(s) 106 may form part of the networked architecture 100C in lieu of forming part of the networked architecture 100A and/or the networked architecture 100B.

The illustrative architecture 100C may further include the one or more client applications 104(1)-104(N). The client applications 104(1)-104(N) may include any client products or services capable of leveraging functionality provided by the payment computer(s) 106 including any of the client applications previously described.

The illustrative architecture 100C may further include various components provided at various financial institutions. One or more financial institutions 134(1)-134(M) are illustratively depicted in FIG. 1C. The variable M may represent any non-negative integer. A respective instance of payment processing modules 138(1)-138(M) may be provided at each of the financial institutions 134(1)-134(M). In various embodiments, each of the payment processing modules 138(1)-138(M) may form part of a respective instance of payment processing platforms 136(1)-136(M). In certain embodiments, each of the payment processing platforms 136(1)-136(M) may be PEP+®—a payment processing platform that enables the origination and receipt of transactions through an ACH network. In various embodiments, the payment processing platforms 136(1)-136(M) provided at the financial institutions 134(1)-134(M) may effectively form a network among the financial institutions 134(1)-134(M). Although the payment processing platforms are illustratively depicted in FIG. 1C as being instances of PEP+®, it should be appreciated that the payment processing platforms 136(1)-136(M) may include any combination of software, hardware, and/or firmware for supporting payment processing functionality.

The payment processing modules 138(1)-138(M) (generically referred to herein as payment processing module 138) may respectively include network interaction components 140(1)-140(M) (generically referred to herein as network interaction component 140) and integration components 142(1)-142(M) (generically referred to herein as integration component 142). The network interaction component 140 of the payment processing module 138 may be communicatively linked to the payment computer(s) 106. In addition, the network interaction component 140 may be communicatively linked to the integration component 142. Core account processing systems 144(1)-144(M) may be respectively provided in association with the financial institutions 134(1)-134(M). Each of the core account processing systems 144(1)-144(M) may include any combination of software, hardware, and/or firmware for facilitating financial transaction processing with respect to financial accounts held at an associated financial institution. Each of the core account processing systems 144(1)-144(M) may be provided locally and/or remotely in relation to a respective financial institution. Further, as previously noted, the payment processing platform 136 and/or the payment processing module 138 may be provided locally and/or remotely in relation to a financial institution and may be hosted by the financial institution or by a third-party service provider. Regardless of the particular manner in which the functionality supported by the payment processing module 138 is implemented, the payment processing module 138 may be thought of as logically executing at the financial institution with which it is associated.

In accordance with various embodiments, the payment processing modules 138(1)-138(M) may enable real-time access to financial accounts held at the financial institutions 134(1)-134(M). More specifically, upon receipt of a financial transaction request from any of the client applications 104(1)-104(N), the payment system 102 (e.g., the payment computer(s) 106) may identify first information and second information included in the request and may further identify a first financial account to be debited and a second financial account to be credited based at least in part on the first information and the second information, respectively. In various embodiments, the first information may comprise a source identifier associated with an account holder of the first financial account or an identifier associated with the first financial account and the second information may comprise a target identifier associated with an account holder of the second financial account or an identifier associated with the second financial account.

Upon identification of the first and second financial accounts, the payment system 102 (e.g., the payment computer(s) 106) may identify a first payment network and a second payment network such that the first financial account and the second financial account are accessible via the first payment network and second payment network, respectively. At least one of the first payment network or the second payment network may comprise a network of financial institutions that includes the financial institutions 134(1)-134(M) and which is enabled by the payment processing modules 138(1)-138(M) respectively associated with the financial institutions 134(1)-134(M). As previously noted, the financial accounts and payment networks via which the financial accounts are accessible may be identified via a datastore lookup or by communicating a request for such information to a service.

Upon identification of the payment networks, the payment system 102 may generate a debit instruction to post a debit to the first financial account and a credit instruction to post a credit to the second financial account and transmit the debit instruction and/or the credit instruction to the first payment network and the second payment network, respectively. In certain embodiments, both the first payment network and the second payment network may correspond to the payment network enabled by the payment processing module 138, in which case, both the debit instruction and the credit instruction may be transmitted to respective payment processing modules 138 (or more specifically respective network interaction components 140) provided at the financial institutions 134 at which the first financial account and the second financial account are held.

Real-time posting of debits and credits may be enabled by the payment processing module 138. For example, upon receipt of a debit instruction or a credit instruction, the network interaction component 140 may communicate an indication of the received instruction to the integration component 142 which may, in turn, interact with the core account processing system 144 to cause an associated debit or credit to be posted to the first financial account or the second financial account in real-time. The debit instruction and/or the credit instruction may be formatted in accordance with an ACH standard even in scenarios in which the associated debit or credit is posted to an appropriate financial account in real-time. In certain embodiments, one side of the financial transaction (e.g., the debit or credit side of the transaction) may be executed in real-time via the network of financial institutions enabled by the payment processing module 138 while the other side of the financial transaction may be executed by transmission of a debit or credit instruction from the payment system 102 to a different network which may or may not be a real-time network.

In various embodiments, the payment processing platforms 136(1)-136(M) may be communicatively linked to one or more payment networks 146. The payment network(s) may include, for example, an ACH network, a debit network, a credit network, and so forth. In certain embodiments, the payment processing platform 136 (which may be PEP+®) may support functionality for the origination and receipt of financial transactions through an ACH network. Accordingly, the payment processing platform 136 may support financial transaction processing through a non-real-time network (e.g., batch processing of financial transactions through an ACH network) as well as real-time processing of financial transactions (e.g., posting of debits and/or credits to financial accounts in real-time) via the payment processing module 138. In addition, the payment processing platform 136 may support settlement processing via, for example, the payment network(s) 146 for both non-real-time financial transactions processed through the payment processing platform 136 as well as debits/credits posted in real-time via the functionality supported by the payment processing module 138.

In various embodiments, the payment system 102 may encompass additional components beyond the payment computer(s) 106. For example, the payment system 102 may comprise an architecture that includes multiple independent system(s) and/or payment gateways capable of communicating among one another to facilitate the processing of financial transactions. In addition, one or more of the client applications 104(1)-104(N) (e.g., illustratively depicted as client application 104(2) in FIG. 1C) may form part of the payment system 102 and may be associated with a same service provider with which the payment computer(s) 106 are associated. Further, in certain embodiments, the payment processing platforms 136(1)-136(M) may each form part of the payment system 102 as illustratively depicted by the dashed line in FIG. 1C. In certain embodiments, the payment processing modules 138(1)-138(M), or more specifically the network interaction components 140(1)-140(M), may be thought of as collectively forming part of the payment system 102 based, at least in part, on the network interaction components 140(1)-140(M) being configured to interact with the payment computer(s) 106 and/or other devices such as router(s), switch(es), and so forth in order to enable real-time posting of debits and/or credits to financial accounts.

In various embodiments, the payment processing module 138 may be configured to support a variety of other types of functionality in addition to that which is described above. In various illustrative embodiments, the payment processing module 138 may be configured to validate a financial account in response to a request received from, for example, the payment computer(s) 106. Validation may include validating that a financial exists and is in good standing. As another illustrative example, the payment processing module 138 may be configured to obtain and communicate account balance information in response to a request received from, for example, the payment computer(s) 106. As yet another illustrative example, the payment processing module 138 may be configured to support funds sufficiency determinations with respect to financial accounts. For example, in response to a request to determine, in real-time, whether a sufficient amount of funds is associated with a financial account, the network interaction component 140 may communicate the request to the integration component 142 which may, in turn, interact with the core account processing system 142 to determine whether a sufficient amount of funds is associated with the account. The received request may include a funds amount that is used to determine whether the financial account includes sufficient funds to cover a debit corresponding to the funds amount. The network interaction component 140 may be configured to communicate a response back to the payment computer(s) 106 indicating whether a sufficient amount of funds are associated with the financial account. In various embodiments, the payment computer(s) 106 and/or one or more other components of the payment system 102 may be configured to transmit, for presentation to the requestor and based at least in part on the response received from the payment processing module 138, an indication of whether the sufficient amount of funds is associated with the financial account to permit a debit of the financial account of the funds amount. It should be appreciated the above-described types of functionality that may be supported by the payment processing module 138 are merely illustrative and that numerous other types of functionality may be supported by the payment processing module 138.

Figure 2:
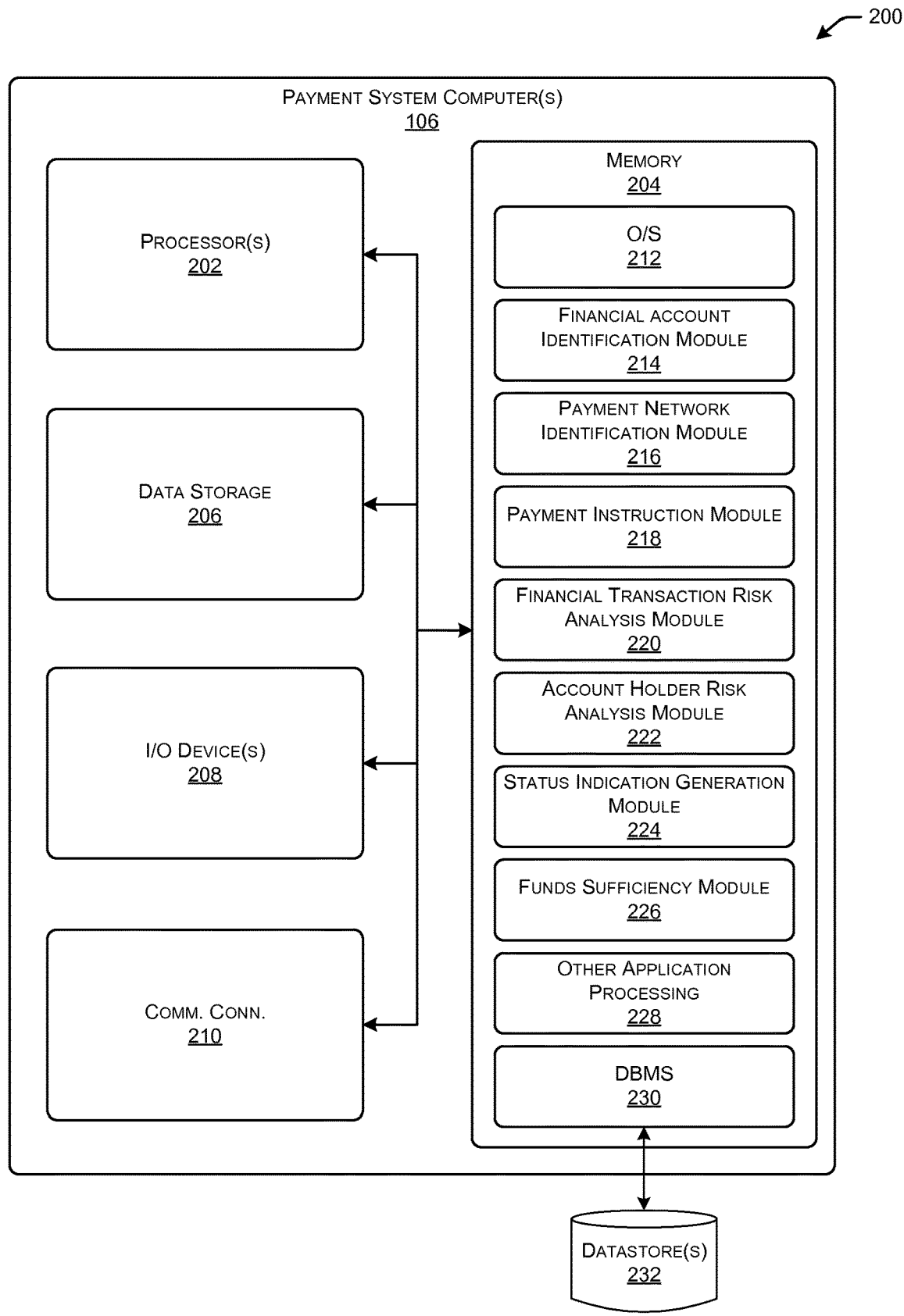
FIG. 2 is a schematic block diagram of an illustrative device for initiating, facilitating, and/or performing processing of one or more sides of a financial transaction in real-time in accordance with one or more embodiments of the disclosure.

FIG. 2 depicts an illustrative payment computer 106 in accordance with one or more embodiments of the disclosure. While the payment computer 106 will be described in the singular through reference to FIG. 2, it should be appreciated that one or more payment computers 106 may be provided, with each payment computer 106 including all or some of the hardware and software components depicted in FIG. 2.

The payment computer may include one or more processors 202 and at least one memory 204. The processor(s) 202 may include any suitable processing unit capable of accepting digital data as input, processing the input data based on stored computer-executable instructions, and generating output data. The computer-executable instructions may be stored, for example, in the at least one memory 204 and may include, for example, operating system software and application software. The processor(s) 202 may be configured to execute the computer-executable instructions to cause various operations to be performed. The processor(s) 202 may include any type of processing unit including, but not limited to, a central processing unit, a microprocessor, a Reduced Instruction Set Computer (RISC) microprocessor, a microcontroller, an Application Specific Integrated Circuit (ASIC), and so forth.

The memory 204 may store program instructions that are loadable and executable by the processor(s) 202, as well as data manipulated by the processor(s) 202 and data generated by the processor(s) 202 during the execution of the program instructions. Depending on the configuration and implementation of the payment computer 106, the memory 204 may be volatile memory (memory that maintains its state when supplied with power) such as random access memory (RAM) and/or non-volatile (memory that maintains its state even when not supplied with power) such as read-only memory (ROM), flash memory, and so forth. In various implementations, the memory 204 may include multiple different types of memory, such as static random access memory (SRAM), dynamic random access memory (DRAM), unalterable ROM, and/or writeable variants of ROM such as electrically erasable programmable read-only memory (EEPROM), flash memory, and so forth.

The payment computer 106 may further include additional data storage 206 such as removable storage and/or non-removable storage including, but not limited to, magnetic storage, optical disk storage, and/or tape storage. Data storage 206 may provide non-volatile storage of computer-executable instructions and other data. The memory 204 and/or the data storage 206, removable and/or non-removable, are all examples of computer-readable storage media (CRSM).

The payment computer 106 may further include communications connection(s) 210 that allow the payment computer 106 to communicate with other computing devices or application software forming part of the networked architecture 100A. For example, the payment computer 106 may utilize the communications connection(s) 210 to communicate with the client applications 104(1)-104(N), the payment networks 108(1)-108(R), and so forth.

The payment computer 106 may additionally include input/output (I/O) device(s) 208, such as a keyboard, a mouse, a pen, a voice input device, a touch input device, a display, speakers, a camera, a microphone, a printer, and so forth, for receiving user input and/or providing output to a user.

The memory 204 may include various program modules comprising computer-executable instructions that upon execution by the processor(s) 202 cause the payment computer 106 to perform various operations. For example, the memory 204 may have loaded therein an operating system (O/S) 212 that provides an interface between other application software executing on the payment computer 106 and hardware resources of the payment computer 106. More specifically, the O/S 212 may include a set of computer-executable instructions for managing hardware resources of the payment computer 106 and for providing common services to other application programs (e.g., managing memory allocation among various application programs). The O/S 212 may include any operating system now known or which may be developed in the future including, but not limited to, a Microsoft Windows® operating system, an Apple OSX™ operating system, Linux, Unix, a mainframe operating system such as Z/OS, a mobile operating system, or any other proprietary or freely available operating system.

The memory 204 may further include various program modules comprising computer-executable instructions that upon execution by the processor(s) 202 cause the payment computer 106 to perform various operations. The functionality provided by these various program/application modules will be described in more detail hereinafter through reference to various accompanying drawings.

Illustrative Processes

Figure 3A:
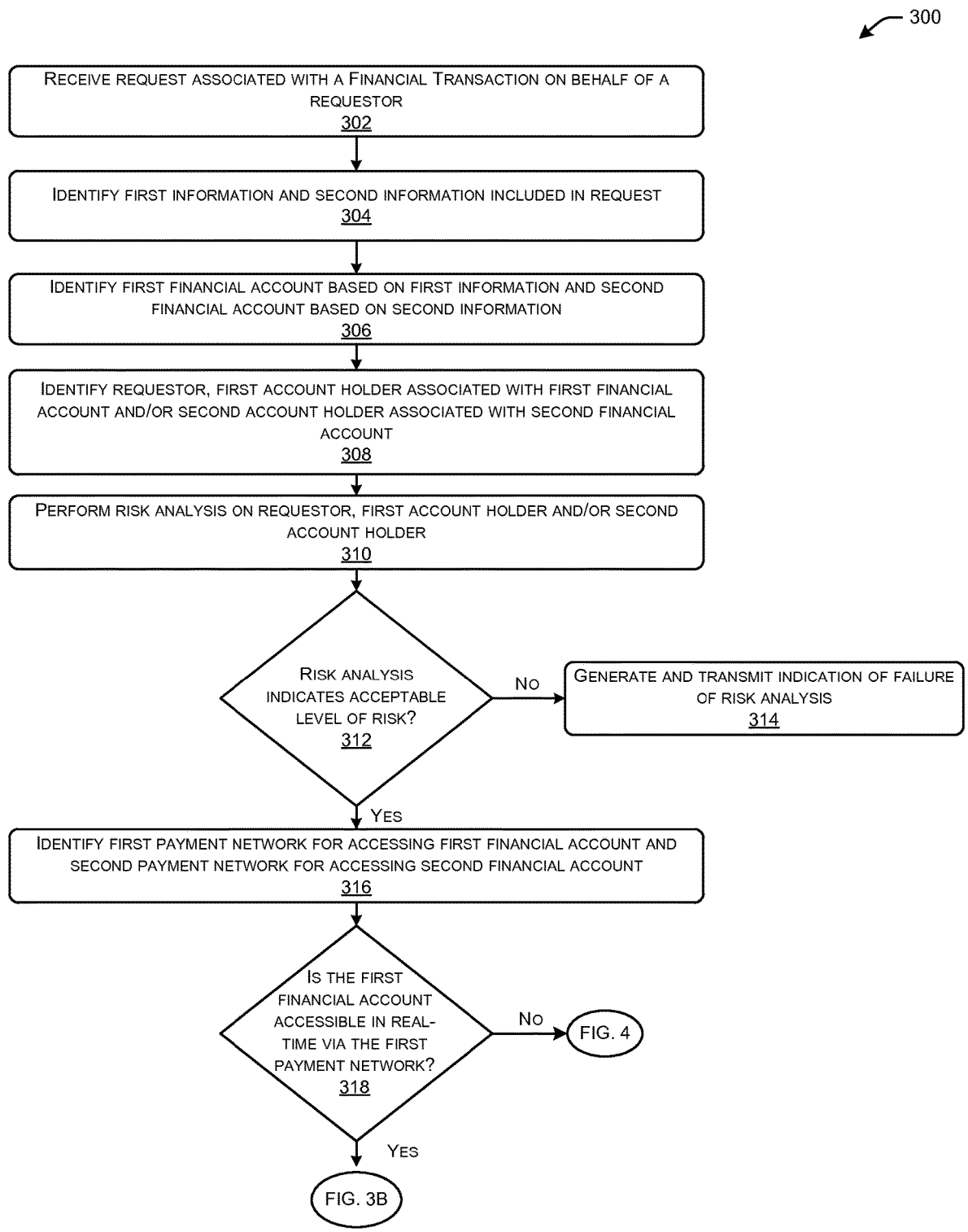
FIGS. 3A-3C are process flow diagrams depicting an illustrative method for initiating, facilitating, and/or performing processing of a financial transaction in which a financial account to be debited and a financial account to be credited are each accessible in real-time via respective payment networks in accordance with one or more embodiments of the disclosure.
Figure 3B:
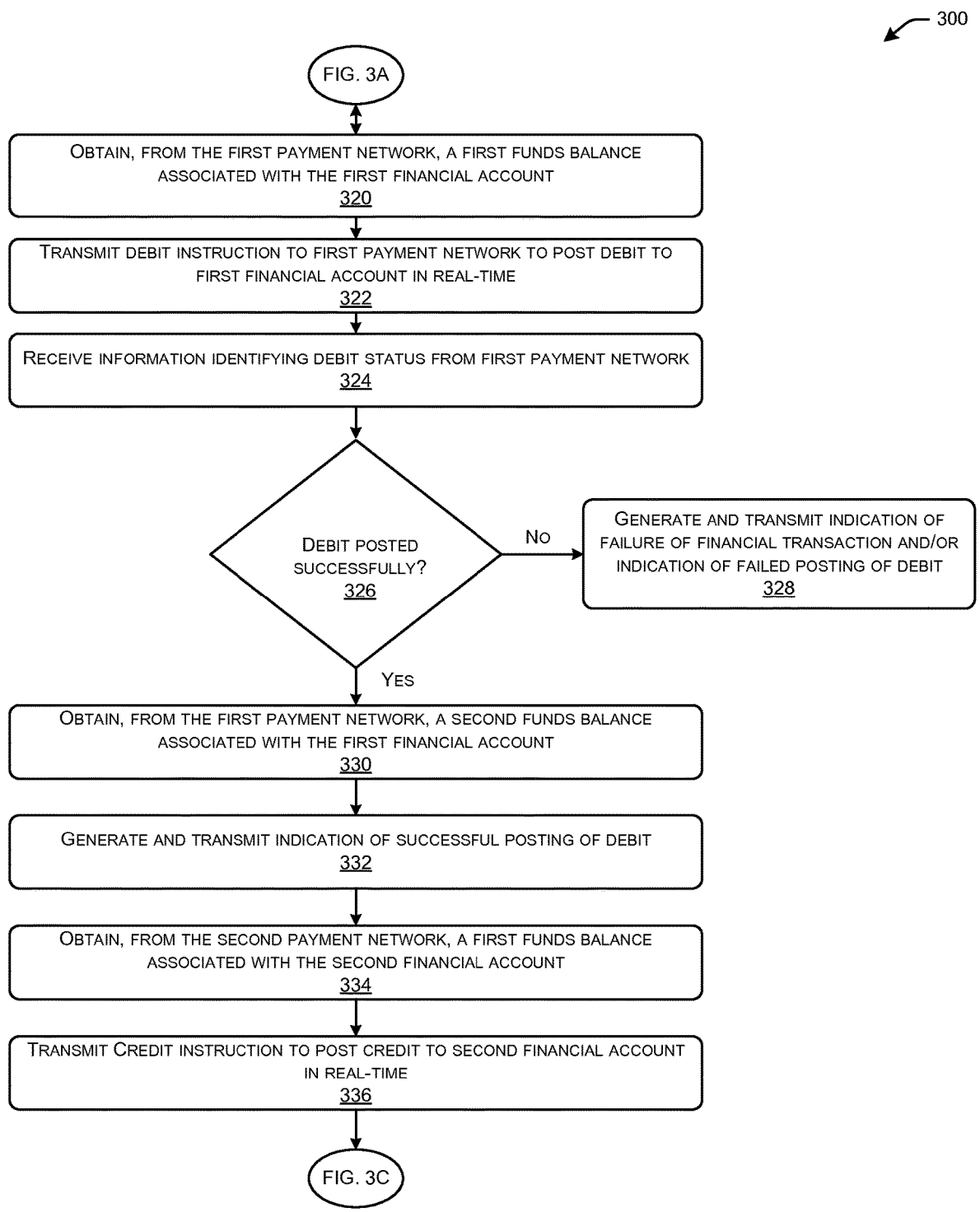
Figure 3C:
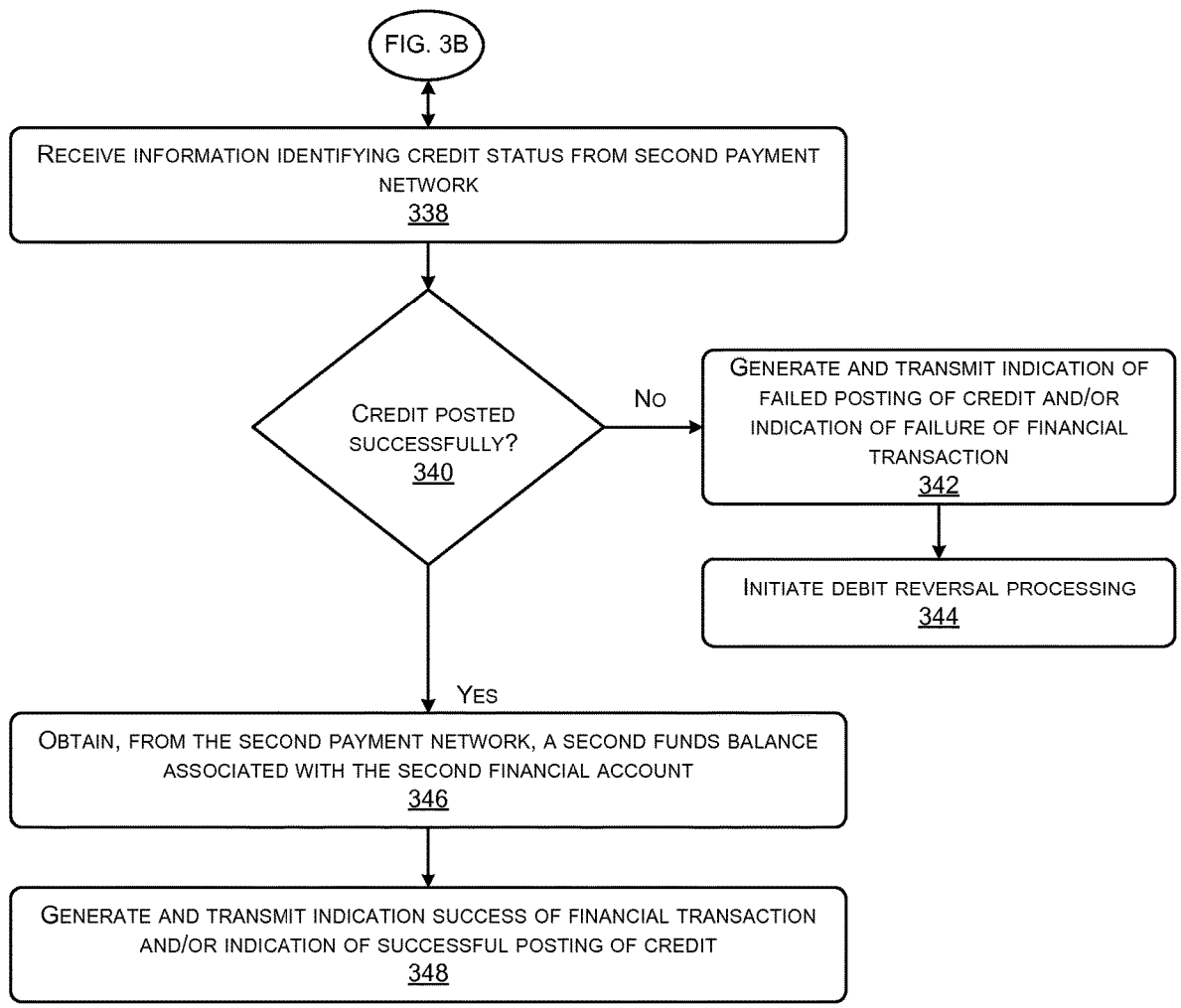

FIGS. 3A-3C depict an illustrative method 300 for initiating, facilitating and/or performing various processing associated with a financial transaction according to which a financial account to be debited and a financial account to be credited may each be accessible in real-time. The illustrative method 300 will be described through reference to the illustrative configuration and implementation of the exemplary payment computer 106 depicted in FIG. 2. However, it should be appreciated that the illustrative method 300 may be performed in connection with any networked architecture and configuration within the scope of this disclosure. Further, while various operations are depicted in the process flow diagrams depicted in FIG. 3A-11, it should be appreciated that any of the depicted operations are optional and that, in various embodiments, any of the operations may not be performed. Further, in various embodiments, additional operations may be performed beyond those which are depicted.

At block 302, the payment system 102 may receive, from a requesting client application (e.g., any of the client applications 104(1)-104(N) supported by the payment system 102) and on behalf of a requestor, a request associated with a financial transaction. In one or more embodiments of the disclosure, at least one of the one or more payment computers 106 forming part of the payment system 102 may receive the request. The request may be, for example, a request to transfer funds from a first financial account to a second financial account or a request to request a transfer of funds from a first financial account to a second financial account. The financial transaction may be a P2P payment, an A2A transfer, or any other financial transaction, including any of the exemplary transactions previously described.

At block 304, the payment system 102 may identify first information and second information included in or otherwise provided in association with the request. The first information may be associated with the first financial account and the second information may be associated with the second financial account. The first information may include a source identifier associated with an account holder of the first financial account and/or an identifier associated with the first financial account. Similarly, the second information may include a target identifier associated with an account holder of the second financial account and/or an identifier associated with the second financial account.

As previously noted, the source identifier and the target identifier may each include a respective one of: (i) an electronic mail address, (ii) a telephone number, (iii) a social network identifier, (iv) a financial account identifier, or (v) an entity identifier. In those embodiments in which the source identifier and/or the target identifier comprises a respective financial account identifier, the financial account identifier may not directly identify the first financial account or the second financial account (e.g., may not be an account number of the first financial account or an account number of the second financial account), but may be used to identify a respective financial account based on its association with either an account holder of the first financial account or an account holder of the second financial account.

Further, in those embodiments in which the source identifier and/or the target identifier comprises a respective entity identifier, the respective entity identifier may comprise one of: a username associated with the payment system (e.g., payment system 102), (ii) a username associated with a first financial institution at which the first financial account is held or a second financial institution at which the second financial account is held, (iii) a government identifier (e.g., a social security number, a tax identification number, etc.), (iv) an identifier associated with a payee of the financial transaction or an identifier associated with a payor of the financial transaction, or (v) an identifier designated by the requestor for identifying a payor or a payee of the financial transaction (e.g., a nickname). It should be appreciated that the above examples of source and target identifiers are not exhaustive and that any suitable identifiers are encompassed within the scope of this disclosure.

At block 306, a first financial account may be identified based at least in part on the first information and a second financial account may be identified based at least in part on the second information. The first and second financial accounts may be identified, for example, as a result of execution, by the processor(s) 202, of computer-executable instructions provided as part of the financial account identification module 214. The first information and/or the second information may include respective financial account identifiers, in which case, the associated first and second financial accounts may be identified via a datastore lookup or via a request to a service configured to identify the financial account(s) based on the financial account identifier(s). In other embodiments, the first information and/or the second information may include a source identifier and/or target identifier which may be respectively associated with an account holder of the first financial account or an account holder of the second financial account. The first financial account and/or the second financial account may then be identified (via a datastore lookup or a request to a service) based on an association between the first financial account and an account holder of the first financial account and/or an association between the second financial account and an account holder of the second financial account.

Blocks 308-314 represent operations associated with a risk analysis that may performed on the requestor, a first account holder associated with the first financial account and/or a second account holder associated with the second financial account. The various operations depicted at blocks 308-314 may be performed, for example, as a result of execution, by the processor(s) 202, of computer-executable instructions provided as part of the account holder risk analysis module 222. While module 222 is termed an account holder risk analysis module, it should be appreciated that the module 222 may include computer-executable instructions for performing a risk analysis on a requestor of a financial transaction even when the requestor is not an account holder of a financial account involved in the financial transaction. As with any of the operations depicted in the various process flow diagrams of FIGS. 3A-11, the risk analysis operations represented by blocks 308-314 may not be performed in various embodiments of the disclosure.

At block 308, the requestor associated with the request received at block 302, a first account holder associated with the first financial account and/or a second account holder associated with the second financial account may be identified. In various embodiments, the requestor may be the first account holder or the second account holder. In other embodiments, the requestor may be a different entity who is authorized by the first account holder or the second account holder to initiate the request associated with the financial transaction. These various entities may be identified based at least in part on the first information and/or the second information as well as, optionally, based on other information that may be received in association with the request.

At block 310, risk analysis processing may be performed on at least one of: the requestor, the first account holder, or the second account holder. The risk analysis may be associated with at least one of: (i) identity verification, (ii) account access authorization, or (iii) fraud detection. The risk analysis processing performed at block 310 may involve an assessment of various characteristics associated with the requestor, the first account holder, the second account holder, and/or the financial transaction request with respect to various risk analysis parameters in order to determine whether a risk identified by the risk analysis processing is acceptable for proceeding with further processing of the financial transaction. The risk analysis processing performed at block 310, may not involve an assessment of attributes associated with the financial transaction itself (e.g., the amount of funds to be debited, the amount of funds to be credited, etc.).

Identity verification may involve processing to determine whether the requestor is who he/she purports to be such as, for example, a first account holder associated with the first financial account or a second account holder associated with the second financial account.

Account access authorization may involve processing to determine that the requestor legitimately associated with at least one of the first financial account or the second financial account, or has been provided authorization to initiate the financial transaction by someone who is legitimately associated with at least one of the first financial account or the second financial account.

Fraud detection risk analysis may involve analysis to determine whether indications of potential fraudulent activity exist. This analysis may be based on one or more of: 1) information associated with a profile of the requestor (e.g., demographic information, information associated with one or more prior transactions, etc.), 2) information associated with the request itself (e.g., the time at which the request was submitted, the location from which the request was submitted), or 3) information associated with the requested financial transaction (e.g., a funds amount associated with the financial transaction, one or more parties or accounts involved in the financial transaction, etc.). The prior transactions may be respectively associated with at least one of: (i) the first account holder associated with the first financial account, (ii) the second account holder associated with the second financial account, or (iii) the requestor.

Further, parameter(s) associated with either the financial transaction or prior transactions may be used in the analysis. Such parameters may include a funds amount associated with the financial transaction, funds amounts associated with prior transactions, a number of financial transactions requested and/or completed over a given period of time, a number of financial transactions requested and/or completed over a given period of time that involve the first financial account and/or the second financial account, and so forth. Fraud detection risk analysis may further include analyzing identifying information associated with the requestor, the first account holder, and/or the second account holder to determine whether any indicators of potentially fraudulent activity exist.

It should be appreciated that, in various embodiments, there may be some overlap in the analyses performed with respect to identity verification, account access authorization, and/or fraud detection. Further, any one or more of the risk analysis processing relating to identity verification, account access authorization, or fraud detection may involve interaction with one or more third parties to assist in the processing (e.g., provide access to externally stored information).

At block 312, a determination may be made as to whether a level of risk identified by the risk analysis processing performed at block 310 is acceptable for proceeding with further processing of the financial transaction. If it is determined that the identified level of risk is not acceptable, the method 300 may proceed to block 314 and an indication that the risk analysis processing has failed may be generated and transmitted, for example, to the requesting client application 104(1)-104(N), potentially for presentation to the requestor. The indication that the risk analysis processing has failed may further be transmitted to one or more notification identifiers associated with the first account holder and/or the second account holder. The indication that the risk analysis processing has failed may be generated and transmitted, for example, upon execution, by the processor(s) 202, of computer-executable instructions provided as part of the status indication generation module 224. On the other hand, if it is determined that the identified level of risk is acceptable, the method 300 may proceed to block 316.

At block 316, a first payment network for accessing the first financial account and a second payment network for accessing the second payment network may be identified. The first and second payment networks may be identified in a variety of ways. For example, the processor(s) 202 may execute computer-executable instructions provided as part of the payment network identification module 216 to access one or more datastores (e.g., datastore(s) 232) to determine whether at least a portion of an identifier associated with the first financial account corresponds to one of one or more stored identifiers stored in the accessed datastore(s). Similarly, one or more datastores (e.g., datastore(s) 232) may be accessed to determine whether at least a portion of an identifier associated with the second financial account corresponds to an identifier stored in the accessed datastore(s).

For example, the datastore(s) may store a respective set of Routing Transit Numbers (RTNs) associated with each of one or more payment networks (e.g., a network of financial institutions). Further, a respective set of Issuer Identification Numbers (IINs) (also referred to as Bank Identification Numbers (BINs)) associated with each of one or more debit and/or credit networks may be stored in the datastore(s). The RTNs and/or IINs associated with various payment networks may be periodically received or extracted from the respective payment networks and stored in the datastore(s). The processor(s) 202 may be configured to execute computer-executable instructions provided as part of the payment network identification module 216 to access the datastore(s) and to determine (i) whether at least a portion of an identifier associated with the first financial account corresponds to an TIN or an RTN stored in the datastore(s) and/or (ii) whether at least a portion of an identifier associated with the second financial account corresponds to an IIN or an RTN stored in the datastore(s). The first payment network and/or the second payment network may be identified based on such a correspondence. It should be appreciated that any suitable stored identifiers beyond RTNs or IINs are within the scope of this disclosure.

In one or more alternative embodiments, the first payment network and/or the second payment network may be identified by utilizing a respective service to determine whether the first financial account and the second financial account are associated with the first payment and the second payment network, respectively. For example, the processor(s) 202 may execute computer-executable instructions provided as part of the payment network identification module 216 to cause the payment computer(s) 106 to transmit a request to a service associated with the first payment network to determine whether the first financial account is associated with the first payment network. The service may optionally communicate with the first payment network to determine whether the first financial account is associated with the first payment network. More specifically, the service may submit a request and receive a response from the first payment network indicating whether the first financial account is associated with the first payment network.

Similarly, the payment computer(s) 106 may transmit a request to a service associated with the second payment network to determine whether the second financial account is associated with the second payment network, and the service may optionally communicate with the second payment network to determine whether the second financial account is associated with the second payment network. More specifically, the service may submit a request and receive a response from the second payment network indicating whether the second financial account is associated with the second payment network. Utilizing a service to identify a payment network may obviate the need for the payment system 102 to locally store information relating to associations between financial accounts and payment networks.

At block 318 of the method 300, a determination may be made as to whether the first financial account is accessible in real-time by the payment system 102 via the first payment network. In various embodiments, the determination at block 318 may be made as part of the identification of payment networks at block 316. For example, the identification of a first payment network at block 316 may be part of an identification of a number of payment networks through which the first financial account may be accessed. Similarly, the identification of the second payment network at block 316 may be part of an identification of a number of payment networks through which the second financial account may be accessed. Accordingly, identification of the first payment network among the plurality of networks through which the first financial account may be accessed may occur at block 318 based on a determination that the first financial account is accessible in real-time via the first payment network. For example, if at least a portion of an identifier associated with the first financial account corresponds to, for example, an IIN or an RTN associated with a particular payment network that provides real-time access to financial accounts, it may be determined that the first financial account is accessible in real-time via that particular payment network and that payment network may be selected as the first payment network. Alternatively, in other embodiments, certain financial accounts accessible via the first payment network may be accessible in real-time while others may not be, in which case, additional information may be accessed, retrieved, and/or obtained in order to determine whether the first financial account is accessible in real-time via the first payment network.

If, at block 318, it is determined that the first financial account is not accessible in real-time, a risk associated with the financial transaction may be determined, and further processing of the financial transaction may occur if the risk associated with the financial transaction is deemed acceptable, as will be described in greater detail through reference to FIG. 4.

Alternatively, if it is determined, at block 318, that the first financial account is accessible in real-time via the first payment network, the method 300 may proceed to block 320, and a first funds balance associated with the first financial account may be obtained by the payment system 102 from the first payment network (FIG. 3B). The first funds balance may be transmitted to the requesting client application, potentially for presentation to the requestor if the requestor is the first account holder.

With continued reference to FIG. 3B, upon obtaining the first funds balance associated with the first financial account, the payment system 102 (e.g., at least one of the payment computers 106) may generate and transmit a debit instruction to the first payment network to post a debit to the first financial account in real-time. In certain embodiments, the first funds balance obtained at block 320 may be compared to a funds amount associated with the financial transaction, and the debit instruction may be transmitted at block 322 only if the first funds balance is sufficient to permit a debit of the funds amount from the first financial account.

The debit instruction may be generated and/or transmitted upon execution, by the processor(s) of computer-executable instructions provided as part of the payment instruction module 218. In various embodiments, the payment system 102 may transmit the debit instruction to the first payment network without first obtaining the first funds balance associated with the first financial account.

Upon transmission of the debit instruction, the payment system 102 may receive from the first payment network, at block 324, information identifying a debit status associated with posting of the debit to the first financial account. At decision block 326, a determination may be made as to whether the debit was successfully posted to the first financial account based on the received information identifying the debit status. If it is determined, at block 326, that the debit failed to successfully post to the first financial account, the method 300 may proceed to block 328, and an indication of failure of the financial transaction and/or an indication of failed posting of the debit may be generated and transmitted to, for example, the requesting client application (e.g., one of client applications 104(1)-104(N)), potentially for presentation to the requestor. For example, the indication of failure of the financial transaction and/or the indication of failed posting of the debit may be generated and/or transmitted upon execution, by the processor(s) 202, of computer-executable instructions provided as part of the status indication generation module 224.

The debit may fail to successfully post for any number of reasons. For example, the first financial account may not contain sufficient funds to cover a debit of a funds amount instructed to be debited from the first financial account by the debit instruction. Alternatively, various restrictions may be associated with the first financial account that may result in failed posting of the debit. Still further, the first financial account may not exist or may no longer be an active account. Accordingly, in certain embodiments, the first funds balance obtained at block 320 may serve as an indication that the first financial account exists and is active. In those embodiments in which the first funds balance associated with the first financial account is not obtained, various other transactions may be performed to verify the existence and active state of the first financial account prior to transmitting the debit instruction at block 322. In still other embodiments, such as those in which the request is a request to request a transfer of funds from the first financial account to the second financial account, an account holder of the first financial account may reject the financial transaction, resulting in a failed posting of the debit.

If it is determined, at block 326, that the debit has successfully posted to the first financial account based on the received information identifying the debit status, the payment system 102 may obtain, at block 330, a second funds balance associated with the first financial account. The second funds balance may be less than the first funds balance as it may reflect the posting of the debit to the first financial account. At block 332, an indication of successful posting of the debit may be generated based at least in part on the received information identifying the debit status. The generated indication of successful posting of the debit may be transmitted to the requesting client application (e.g., any of client applications 104(1)-104(N)), potentially for presentation to the requestor. An indication of the second funds balance obtained at block 330 may also be transmitted to the requesting client application, potentially for presentation to the requestor if the requestor is the first account holder, and, in certain embodiments, may be transmitted as part of the indication of the successful posting of the debit. As previously described with respect to other indications, in various embodiments, the indication of successful posting of the debit may be generated and/or transmitted upon execution, by the processor(s) 202, of computer-executable instructions provided as part of the status indication generation module 224.

The operations for obtaining the first and second funds balances associated with the first financial account may be performed, in various embodiments, upon execution, by the processor(s) 202, of computer-executable instructions provided as part of one or more additional modules 228 capable of performed additional application processing. Further, the one or more additional modules 228 may include computer-executable instructions that, upon execution by the processor(s) 202, cause any other suitable processing to be performed in connection with the processing of the financial transaction. However, it should be appreciated that, as with any of the other depicted operations, the operations for obtaining the first and second funds balances associated with the first financial account may not be performed in various embodiments of the disclosure. Further, transmission of either of the first funds balance or the second funds balance, the indication of the successful posting of the debit, the indication of the failed posting of the debit, and/or the indication of the failure of the financial transaction may be generated at any point within the process flow 300 upon receipt of the first balance, the second balance, and/or the information identifying the debit status, or may not be generated at all.

With continued reference to FIG. 3B, at block 334, a first funds balance associated with the second financial account may be obtained by the payment system 102 from the second payment network. The first funds balance may be transmitted to the requesting client application, potentially for presentation to the requestor if the requestor is the second account holder. Upon obtaining the first funds balance associated with the second financial account, the payment system 102 (e.g., at least one of the payment computers 106) may, at block 336, generate and transmit a credit instruction to the second payment network to post a credit to the second financial account in real-time. In certain embodiments, the credit instruction may only be transmitted to the second payment network upon receipt of information from the first payment network indicating that the debit successfully posted to the first financial account.

The credit instruction may be generated and/or transmitted upon execution, by the processor(s) 202, of computer-executable instructions provided as part of the payment instruction module 218. The second financial account may have been determined to be accessible in real-time via the second payment network using any of the mechanisms or methodologies previously described. Further, in various embodiments, the payment system 102 may transmit the credit instruction to the second payment network without first obtaining the first funds balance associated with the second financial account. For example, in those embodiments in which the requestor is not associated with the second financial account, funds balance information associated with the second financial account may not be obtained.

Referring now to FIG. 3C, upon transmission of the credit instruction at block 336, the payment system 102 may receive from the second payment network, at block 338, information identifying a credit status associated with posting of the credit to the second financial account. At decision block 340, a determination may be made as to whether the credit was successfully posted to the second financial account based on the received information identifying the credit status. If it is determined, at block 340, that the credit failed to successfully post to the second financial account, the method 300 may proceed to block 342, and an indication of failure of the financial transaction and/or an indication of failed posting of the credit may be generated and transmitted to, for example, a client application (e.g., one of client applications 104(1)-104(N)) for presentation to the requestor. For example, the indication of failure of the financial transaction and/or the indication of failed posting of the credit may be generated and/or transmitted upon execution, by the processor(s) 202, of computer-executable instructions provided as part of the status indication generation module 224.

The credit may fail to post successfully for any number of reasons. For example, various restrictions associated with the second financial account may result in failed posting of the credit. In other embodiments, the second account holder of the second financial account may reject the financial transaction, resulting in a failed posting of the credit. In still other embodiments, the second financial account may not exist or may no longer be active. Accordingly, in certain embodiments, the first funds balance obtained at block 330 may serve as an indication that the second financial account exists and is active. In those embodiments in which the first funds balance associated with the second financial account is not obtained, various other transactions may be performed to verify the existence and active state of the second financial account prior to transmitting the credit instruction at block 336.

If it is determined at block 340 that the credit has failed to successful post to the second financial account, debit reversal processing may be initiated at block 344. In accordance with one or more embodiments of the disclosure, the payment system 102 may initiate debit reversal processing by generating and transmitting a debit reversal instruction to the first payment network to reverse the debit instructed to be posted to the first financial account by the debit instruction previously transmitted to the first payment network. In certain embodiments, the first payment network may receive the debit reversal instruction and reverse the debit that posted to the first financial account in response to the debit instruction received from the payment system 102. The payment system 102 may receive information from the first payment network identifying a debit reversal status which may comprise successful reversal of the posted debit or failed reversal. An indication of the debit reversal status may be transmitted to the requesting client application, potentially for presentation to the requestor if the requestor is the first account holder.

If it is determined, at block 340, that the credit has posted successfully based on the received information identifying the credit status, the payment system 102 may obtain, at block 346, a second funds balance associated with the second financial account from the second payment network. The second funds balance may be greater than the first funds balance as it may reflect the posting of the credit to the second financial account. At block 348, an indication of successful posting of the credit and/or an indication of success of the financial transaction may be generated based at least in part on the received information identifying the credit status. The generated indication(s) may be transmitted to the requesting client application (e.g., any of client applications 104(1)-104(N)), potentially for presentation to the requestor. The second funds balance obtained at block 346 may also be transmitted to the requesting client application, potentially for presentation to the requestor if the requestor is the second account holder, and, in certain embodiments, may be transmitted as part of the indication of the successful posting of the credit. The indication(s) associated with block 348 may be generated and/or transmitted upon execution, by the processor(s) 202, of computer-executable instructions provided as part of the status indication generation module 224.

The operations that may form part of the illustrative method 300 from receipt of the request associated with the financial transaction at block 302 to generation and transmission of any of the various indications (e.g., indication of success of the financial transaction at block 348) may be performed as part of a single communication session. For example, a communication session may be established between the requestor and a client application (e.g., any of client applications 104(1)-104(N)), and, by extension, between the client application and the payment system, via which the request associated with the financial transaction at block 302 is received and associated response(s) are transmitted. Further, any of the indications that may be generated as part of the method 300 (e.g., the indication of success of the financial transaction) may be transmitted to the requesting client application, potentially for presentation to the requestor, as part of the same communication session. As such, real-time accessibility of a financial account may refer to an in-session posting of a debit and/or credit to the financial account and/or an in-session generation and transmission of an indication of success or failure of the posting of the debit and/or credit and/or an indication of success or failure of the financial transaction.

According to various embodiments, control of the communication session may be transferred to various entities (e.g., the requesting client application, the payment system 102, a payment network, a financial institution, etc.) at various stages of the method 300. It should be noted that above discussion with respect to communication session aspects of the disclosure is equally applicable to any of the other illustrative embodiments of the disclosure (e.g., any of the illustrative methods depicted in FIGS. 4-11).

Further, as with the operations for obtaining the first and second funds balances associated with the first financial account, the operations for obtaining the first and second funds balances associated with the second financial account may be performed, in various embodiments, upon execution, by the processor(s) 202, of computer-executable instructions provided as part of one or more additional modules 228 capable of performed additional application processing. However, it should be appreciated that, as with any of the other depicted operations, the operations for obtaining the first and second funds balances associated with the second financial account may not be performed in various embodiments of the disclosure. Further, the indication of the successful posting of the credit, the indication of the failed posting of the credit, and/or the indication of the failure or success of the financial transaction may be generated at any point within the process flow 300 upon receipt of the information identifying the credit status, or may not be generated at all.

The method 300 depicted in FIGS. 3A-3C has been described through reference to the illustrative configuration of a payment computer 106 depicted in FIG. 2. However, it should be appreciated that the method 300, as well as any of the illustrative methods depicted in FIGS. 4-11, may be performed by a payment system including one or more payment computers 106 having any suitable configuration. For example, although various operations have been described as being performed upon execution of computer-executable instructions provided as part of certain program modules, it should be appreciated that any of the operations of any of the embodiments of the disclosure may be performed upon execution of computer-executable instructions organized or implemented in any manner. That is, the specific program modules depicted in FIG. 2 are presented purely for illustrative purposes, and any combination of hardware components and/or software components structured according to any suitable configuration or methodology may be utilized to perform various operations described herein.

Various operations forming part of the various illustrative methods depicted in FIGS. 4-11 may now be described through reference to the specific program modules depicted in FIG. 2. However, it should be appreciated that such operations, in various embodiments, may be performed upon execution of computer-executable instructions provided as part of the specific program modules depicted in FIG. 2 and/or upon execution of computer-executable instructions structure according to any suitable implementation.

FIG. 4 is a process flow diagram depicting an illustrative method 400 for initiating, facilitating, and/or performing processing of a financial transaction in which a financial account to be debited is not accessible in real-time and a financial account to be credited is accessible in real-time. According to various embodiments of the disclosure, the method 400 may be performed upon a determination that a first financial account to be debited in connection with a financial transaction is not accessible in real-time via a first payment network (e.g., a negative determination at block 318 of the method 300 depicted in FIGS. 3A-3C). The determination that the first financial account is not accessible in real-time via the first payment network may be made, for example, based at least in part on a lack of correspondence between at least a portion of an identifier associated with the first financial account and any identifiers (e.g., RTNs, IINs, etc.) stored in one or more datastores. Alternatively, such a determination may be made by submitting a request to a service to determine whether the first financial account is accessible in real-time via the first payment network and receiving a response indicating the determination.

At block 402, a risk analysis associated with the financial transaction may be performed. The risk analysis may include the determination and use of one or more various parameters associated with the financial transaction such as, for example, a funds amount associated with the financial transaction, a sum total, over a period of time, of funds amounts associated with prior transactions and a funds amount associated with the financial transaction, a total number of transactions over a period of time including the financial transaction and prior transactions, and so forth. The prior transactions may be of the same type as the financial transaction or may be of one or more different types. The prior transactions may involve the same first or second financial accounts as the financial transaction or may involve one or more different financial accounts.

The one or more parameters may be compared to corresponding limitations imposed by a financial institution at which a financial account is held or by some other entity, such as the payment service provider hosting the payment system. The limitations may be scoped to the particular financial account, the account holder, a group of accounts associated with a financial institution or some other entity, or a group of account holders associated with a financial institution or some other entity. Such limitations may include, for example, a maximum permissible number of allowable financial transactions, potentially of a particular type, within a given time period; a maximum permissible total funds amount associated with such transactions; a maximum permissible funds amount associated with any given financial transaction, and so forth.

If, based on a comparison of the parameters and the limitations, it is determined that a particular limit is exceeded, this may indicate failure of the risk analysis. In contrast, if the comparison of the parameters to the limitations indicates that the particular limit is not exceeded, this may indicate success of the risk analysis. In certain embodiments, multiple tests may be performed. For example, the funds amount associated with the financial transaction may be compared to a maximum permissible funds amount for the financial transaction type, a total funds amount (including the funds amount associated with the financial transaction and funds amounts associated with prior transactions over a period of time) may be compared to a maximum permissible total funds amount over the period of time, a number of financial transactions over a period of time may be compared to a maximum permissible number of financial transactions over the period of time, and so forth. In such embodiments, failure of any particular test may indicate failure of the risk analysis with respect to the financial transaction overall.

In various embodiments, the risk analysis performed at block 402 may additionally, or alternatively, include the generation of a "risk score" that provides a quantitative measure of a level of risk associated with the financial transaction. The "risk score" may be generated based at least in part on an analysis of various parameters associated with the financial transaction with respect to various imposed limitations as described above. The risk analysis performed at block 402 may result in a determination, at block 404, as to whether a risk associated with the financial transaction is acceptable (e.g., whether the various tests described above that may be performed as part of the risk analysis resulted in success). In certain embodiments, a risk score that meets or exceeds a threshold level (or meets or falls below a threshold level) may indicate an acceptable risk associated with financial transaction, while risk scores that do not satisfy such criteria may indicate unacceptable risk associated with the financial transaction. If it is determined that the risk presented by the financial transaction is not acceptable, the method 400 may proceed to block 406 where additional processing associated with the determination that the risk is unacceptable may be performed.

Various selectable payment options for processing the financial transaction may be presented to the client application via which the request associated with the financial transaction was submitted on behalf of the requestor. For example, the selectable payment options may be transmitted to the client application for presentation to the requestor if a risk associated with the financial transaction is deemed unacceptable. However, it should be appreciated that selectable payment options may also be transmitted for presentation to the requestor in scenarios in which the risk is deemed acceptable. The various selectable payment options may include, for example, one or more alternate payment networks available for processing the financial transaction, one or more alternate financial accounts, one or more fees or surcharges for processing the financial transaction, a funds amount limit associated with the financial transaction, one or more alternate payment posting or processing times, and so forth. In certain embodiments, the type or amount of a payment option may be based, at least in part, on a generated risk score.

The client application may receive one or more selections of payment options from the requestor and convey the selections to payment system 102 in order to effectuate processing of the financial transaction. Further, in certain embodiments, the client application may provide the requestor with the option of canceling the request associated with the financial transaction if no combination of payment options is attractive to the requestor. In certain embodiments, in lieu of or in addition to transmitting various selectable payment options for presentation to the requestor and/or generating a risk score, an indication of failure of the financial transaction and/or an indication of failed posting of the debit may be generated and transmitted to the requesting client application, potentially for presentation to the requestor.

On the other hand, if it is determined at block 404, that the determined risk associated with the financial transaction is acceptable, the method 400 may proceed to block 408, and the payment system 102 may transmit a debit instruction to the first payment network to post a debit to the first financial account. In various embodiments, the determination at block 404 may be performed as part of the risk analysis performed at block 402.

In certain embodiments, the risk analysis performed with respect to the financial transaction may merely determine whether the risk is acceptable or not (e.g., whether the various parameters associated with the financial transaction and/or prior transactions fall within established limitations). In other embodiments, the risk analysis may "score" the risk based on one or more statistical analyses or modeling techniques. The score may quantity the risk associated with the financial transaction along some pre-established gradient. The risk "score" may then be compared to a threshold (which may be a generic threshold or uniquely determined based on various characteristics associated with the financial transaction) to determine whether the risk associated with the financial transaction is acceptable or not.

As the first financial account is not accessible in real-time via the first payment network in this embodiment, an in-session indication of successful or failed posting of the debit may not be received in connection with the illustrative method 400. According to various embodiments of the disclosure, the first payment network may be, for example, a conventional ACH network, or any other network that provides access to the first financial account, but which does not provide real-time access to the first financial account.

At block 410, a credit instruction may be generated and transmitted to the second payment network to post a credit to the second financial account in real-time. The second payment network may be identified according to any of the mechanisms or methodologies previously described. Further, a determination that the second payment network provides real-time access to the second financial account may be made according to any of mechanisms or methodologies previously described.

At block 412, information identifying a credit status may be received by the payment system 102 from the second payment network. At decision block 414, a determination may be made, based at least in part on the received information identifying the credit status, as to whether the credit successfully posted to the second financial account. If it is determined that the credit successfully posted to the second financial account, an indication of successful posting of the credit and/or an indication of success of the financial transaction may be generated and transmitted to the requesting client application, potentially for presentation to the requestor at block 416. Alternatively, if it is determined that the credit failed to successfully post to the second financial account, the method 400 may proceed to block 418, and an indication of failed posting of the credit and/or an indication of failure of the financial transaction may be generated and transmitted to the requesting client application, potentially for presentation to the requestor.

At block 414, if it is determined that the credit has failed to successfully post to the second financial account, debit reversal processing may be initiated at block 420. In accordance with one or more embodiments of the disclosure, the payment system 102 may initiate debit reversal processing by generating and transmitting a debit reversal instruction to the first payment network to reverse the debit instructed to be posted to the first financial account by the debit instruction previously transmitted to the first payment network. In certain embodiments, the first payment network may receive the debit reversal instruction and reverse the debit that posted to the first financial account in response to the debit instruction received from the payment system 102.

In the process flow 400 depicted in FIG. 4, the first financial account is not accessible in real-time via the first payment network. In such embodiments, the first payment network may receive the debit reversal instruction and cancel posting of the debit to the first financial account prior to any indication of posting of the debit being presented to the requestor and/or an account holder of the first financial account. The payment system 102 may receive information from the first payment network identifying a debit reversal status which may comprise successful reversal of the posted debit or failed reversal. An indication of the debit reversal status may be transmitted to the requesting client application, potentially for presentation to the requestor if the requestor is the first account holder.

While not depicted in FIG. 4, it should be appreciated that various other operations may be performed as part of the method 400 such as, for example, obtaining funds balances associated with the second financial account prior to and subsequent to transmission of the credit instruction to the second payment network and transmitting such balances to the requesting client application, potentially for presentation to the requestor, assuming the requestor is the account holder of the second (e.g., credited financial account.) It should further be appreciated that various other operations that are not depicted may be performed as part of method 400 and that various other operations that are depicted may not be performed in certain embodiments.

Figure 5:
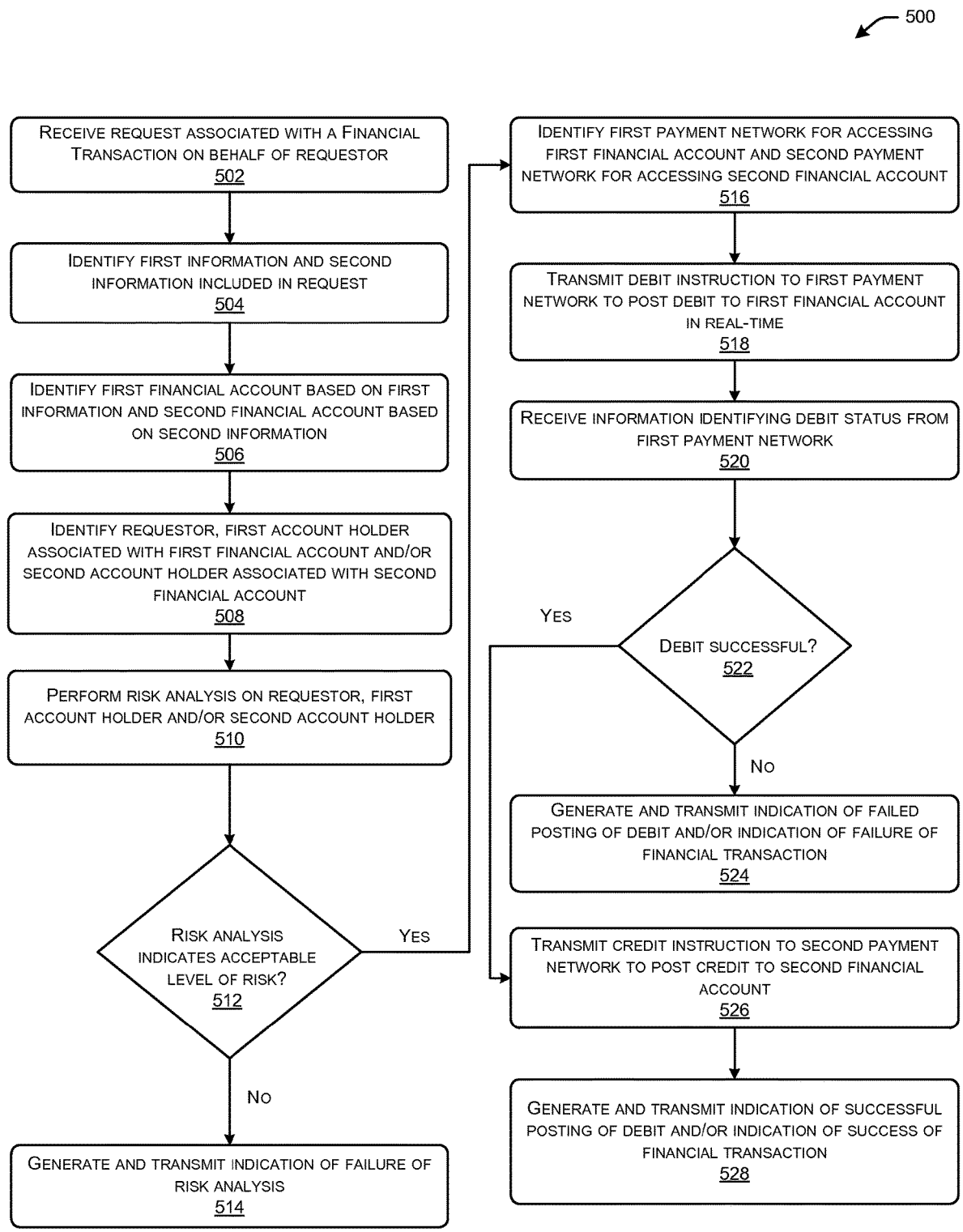
FIG. 5 is a process flow diagram depicting an illustrative method for initiating, facilitating, and/or performing processing of a financial transaction in which a financial account to be debited is accessible in real-time and a financial account to be credited is not accessible in real-time in accordance with one or more embodiments of the disclosure.

FIG. 5 depicts another illustrative embodiment of the disclosure in which a financial account to be debited is accessible in real-time and a financial account to be credited is not accessible in real-time. Operations performed at blocks 502-516 may correspond to operations 302-316 depicted in FIG. 3A, respectively.

At block 518 of the method 500, a first payment network for accessing the first financial account and a second payment network for accessing the second financial account may be identified. As previously noted, the identification of the first payment network may be part of an identification of a number of payment networks through which the first financial account may be accessed. Similarly, the identification of the second payment network may be part of an identification of a number of payment networks through which the second financial account may be accessed.

In various embodiments, the requestor, on whose behalf the request associated with the financial transaction is received at block 502, may request that at least the credit component of the financial transaction be performed in real-time. Further, as part of the identification of the second payment network at block 518, it may be determined that no payment network exists for accessing the second financial account in real-time. In such embodiments, the requestor may be informed of the non-existence of a payment network for accessing the second financial account in real-time. The requestor may be provided with an option of canceling the request or otherwise preventing the financial transaction from being processed. In addition, or in the alternative, the requestor may be provided with the option of proceeding with the financial transaction using a payment network capable of accessing the second financial account, albeit not in real-time. In other embodiments, the requestor may have previously indicated approval to proceed with the financial transaction even if a payment network is not available for accessing the second financial account in real-time, in which case the payment system 102, for example, may automatically select a payment network for accessing the second financial account. In other embodiments, this may be a default setting. In still other embodiments, a transaction date associated with the financial transaction may indicate that a payment network that is not capable of accessing a financial account is real-time is acceptable. The transaction date may be specified explicitly (e.g., a specific future date) in connection with the request, or may be implied (e.g., an indication that a certain time period for processing the financial transaction is acceptable).

At block 518, the payment system 102 may generate and transmit a debit instruction to the first payment network to post a debit to the first financial account in real-time. The payment system 102 may determine that the first financial account is accessible in real-time via the first payment network using any of the mechanisms or methodologies previously described.

At block 520, the payment system 102 may receive information identifying a debit status associated with posting of the debit from the first payment network. At decision block 522, a determination may be made as to whether the debit successfully posted to the first financial account. If it is determined that the debit failed to successfully post to the first financial account, an indication of failed posting of the debit and/or an indication of failure of the financial transaction may be generated and transmitted, at block 524, to the requesting client application, potentially for presentation to the requestor.

On the other hand, if it is determined that the debit successfully posted to the first financial account, the payment system 102 may, at block 526, generate and transmit a credit instruction to the second payment network to post a credit to the second financial account. According to illustrative method 500, the second financial account is not accessible in real-time via the second payment network. As such, if the credit successfully posts to the second financial account, such posting of the credit may not occur in-session. Accordingly, a determination may first be made that the debit successfully posted to the first financial account prior to transmitting the credit instruction in order to avoid having to initiate a collection process to obtain already credited funds or to avoid potential delays or difficulties in reversing a credit that has posted to the second financial account or in reversing a credit instruction transmitted to the second payment network.

Upon transmission of the credit instruction, the payment system 102 may, at block 528, generate an indication of successful posting of the debit and/or an indication of success of the financial transaction and transmit the generated indication(s) to the requesting client application, potentially for presentation to the requestor. In certain embodiments, the payment system 102 may not be able to generate and transmit an indication of success of the financial transaction because a credit status of the posting of the credit instructed by the credit instruction may not yet be known.

Figure 6:
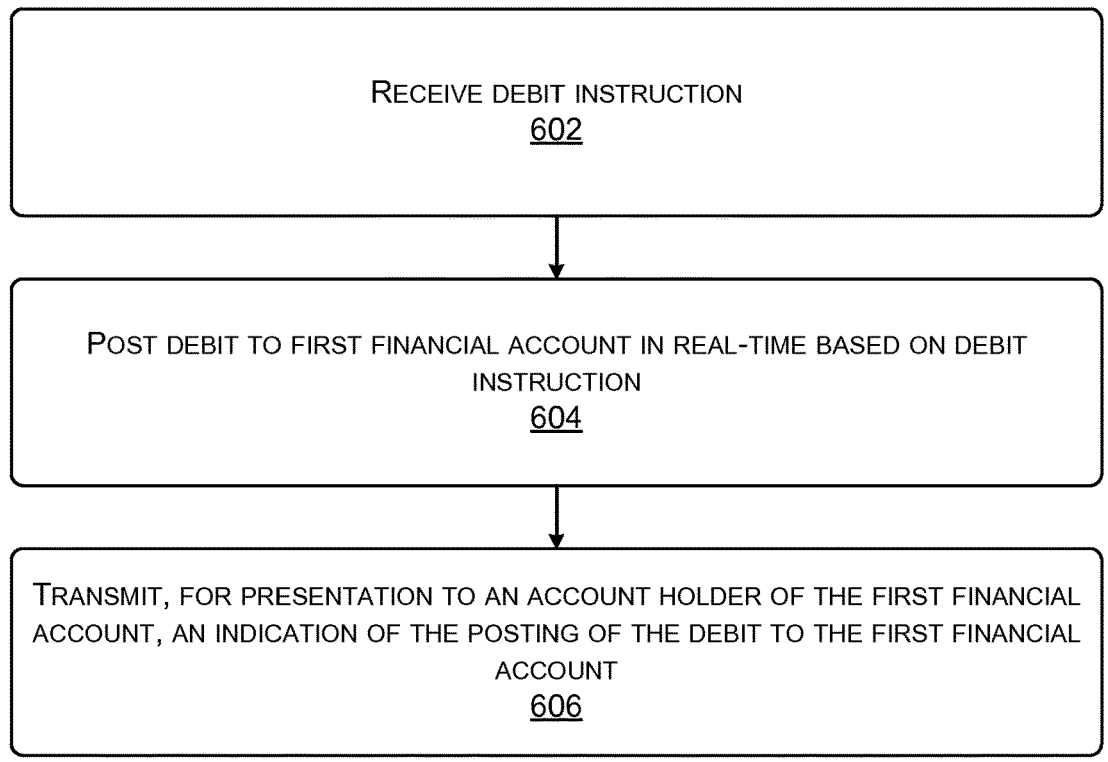
FIG. 6 is a process flow diagram depicting an illustrative method for posting a debit in response to a debit instruction and transmitting an indication of the posting of the debit in accordance with one or more embodiments of the disclosure.

FIG. 6 is a process flow diagram depicting an illustrative method 600 for posting a debit in response to a debit instruction and transmitting an indication of the posting of the debit in accordance with one or more embodiments of the disclosure. The illustrative method 600 may be performed by a core account processing system that may be associated with the first financial account (e.g., any of core account processing systems 110(1)-110(S), 112(1)-112(T), 114(1)-114(U)). The core account processing system may include one or more modules integrated therewith that facilitate interaction with the first payment network. In various embodiments, the first payment network, the modules that integrate with the core account processing system, and/or the core account processing system itself may form part of the payment system 102.

At block 602a core account processing system associated with the first financial account may receive a debit instruction via the first payment network from at least one payment computer 106 of the payment system 102. At block 604, the core account processing system may post a debit to the first financial account in real-time, as instructed by the debit instruction. At block 606, an indication of posting of the debit to the first financial account may be transmitted for presentation to an account holder of the first financial account. For example, the indication may be transmitted to a user interface (e.g., any of the user interfaces depicted in FIG. 1A) associated with the first financial account such as an online banking interface that may be used to view transaction details and control account functionality associated with the first financial account. It should be appreciated that the method 600 assumes successful posting of the debit to the first financial account. It should further be appreciated that, in various embodiments, the first financial account may not be accessible in real-time via the first payment network.

Figure 7:
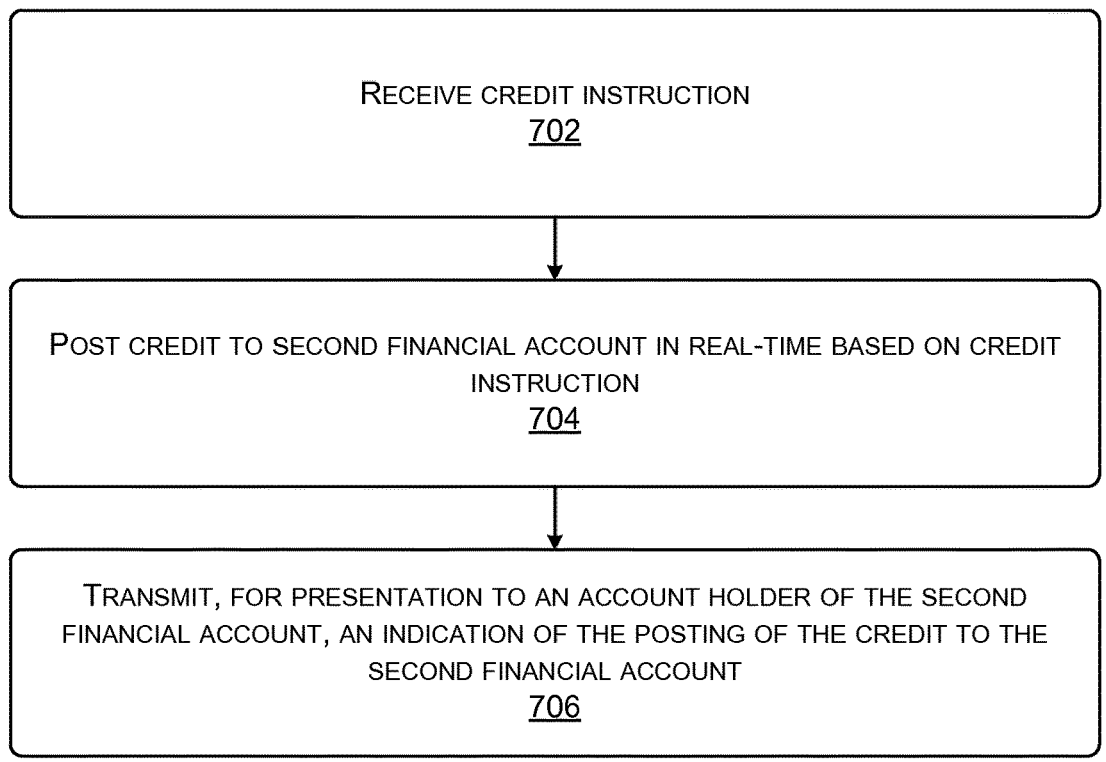
FIG. 7 is a process flow diagram depicting an illustrative method for posting a credit in response to a credit instruction and transmitting an indication of the posting of the credit in accordance with one or more embodiments of the disclosure.

FIG. 7 is a process flow diagram depicting an illustrative method 700 for posting a credit in response to a credit instruction and transmitting an indication of the posting of the credit in accordance with one or more embodiments of the disclosure. The illustrative method 700 may be performed by a core account processing system that may be associated with the second financial account (e.g., any of core account processing systems 110(1)-110(S), 112(1)-112(T), 114(1)-114(U)). The core account processing system may include one or more modules integrated therewith that facilitate interaction with the second payment network. In various embodiments, the second payment network, the modules that integrate with the core account processing system, and/or the core account processing system itself may form part of the payment system 102.

At block 702, the core account processing system associated with the second financial account may receive a credit instruction via the second payment network from at least one payment computer 106 of the payment system 102. At block 704, the core account processing system may post a credit to the second financial account in real-time, as instructed by the credit instruction. At block 706, an indication of posting of the credit to the second financial account may be transmitted for presentation to an account holder of the second financial account. For example, the indication may be transmitted to a user interface (e.g., any of the user interfaces depicted in FIG. 1A) associated with the second financial account such as an online banking interface that may be used to view transaction details and control account functionality associated with the second financial account. It should be appreciated that the method 700 assumes successful posting of the credit to the second financial account. It should further be appreciated that, in various embodiments, the second financial account may not be accessible in real-time via the second payment network.

Figure 8:
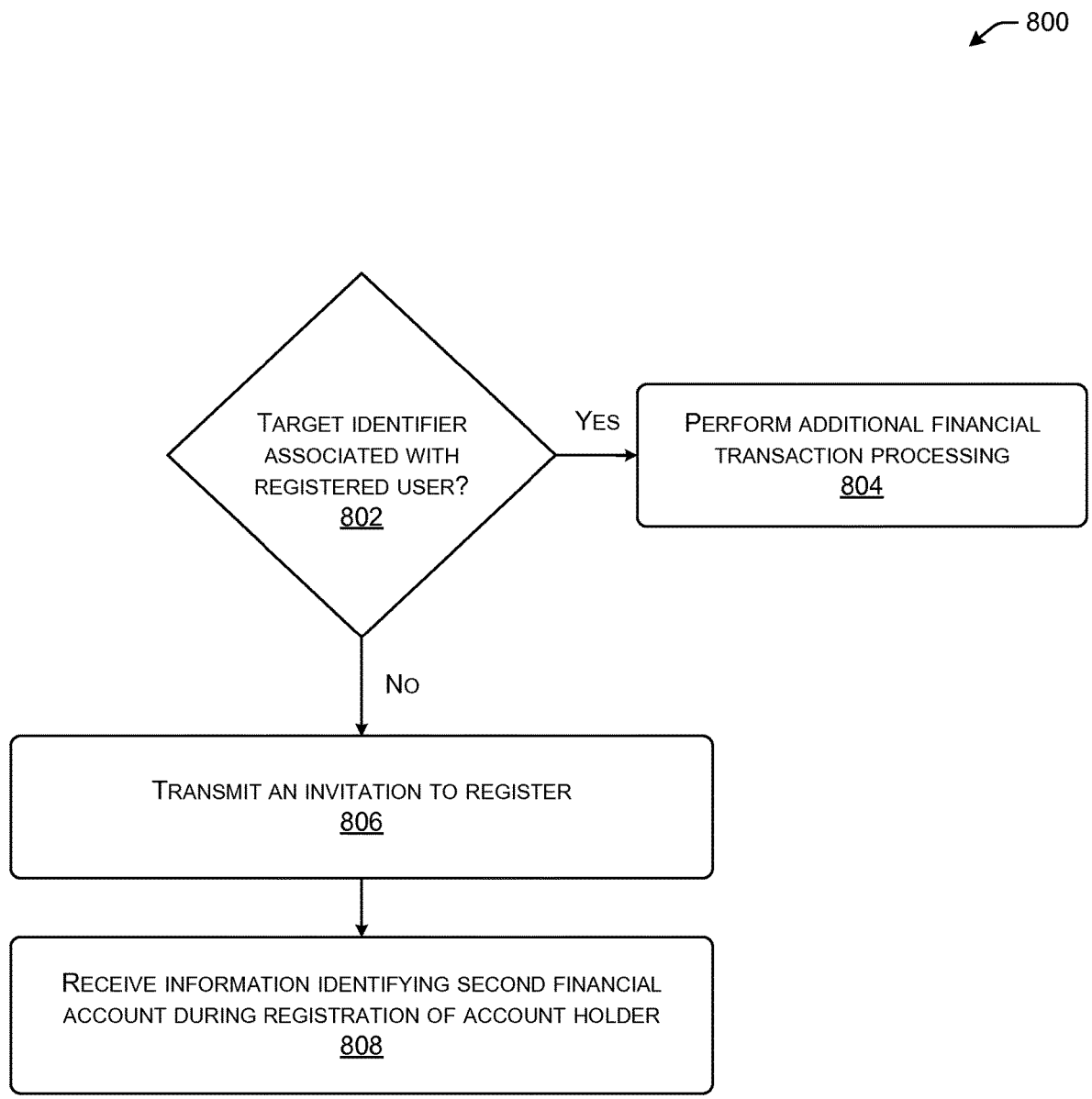
FIG. 8 is a process flow diagram depicting an illustrative method for facilitating registration of an account holder of a financial account to be credited in connection with a financial transaction in accordance with one or more embodiments of the disclosure.
Figure 9:
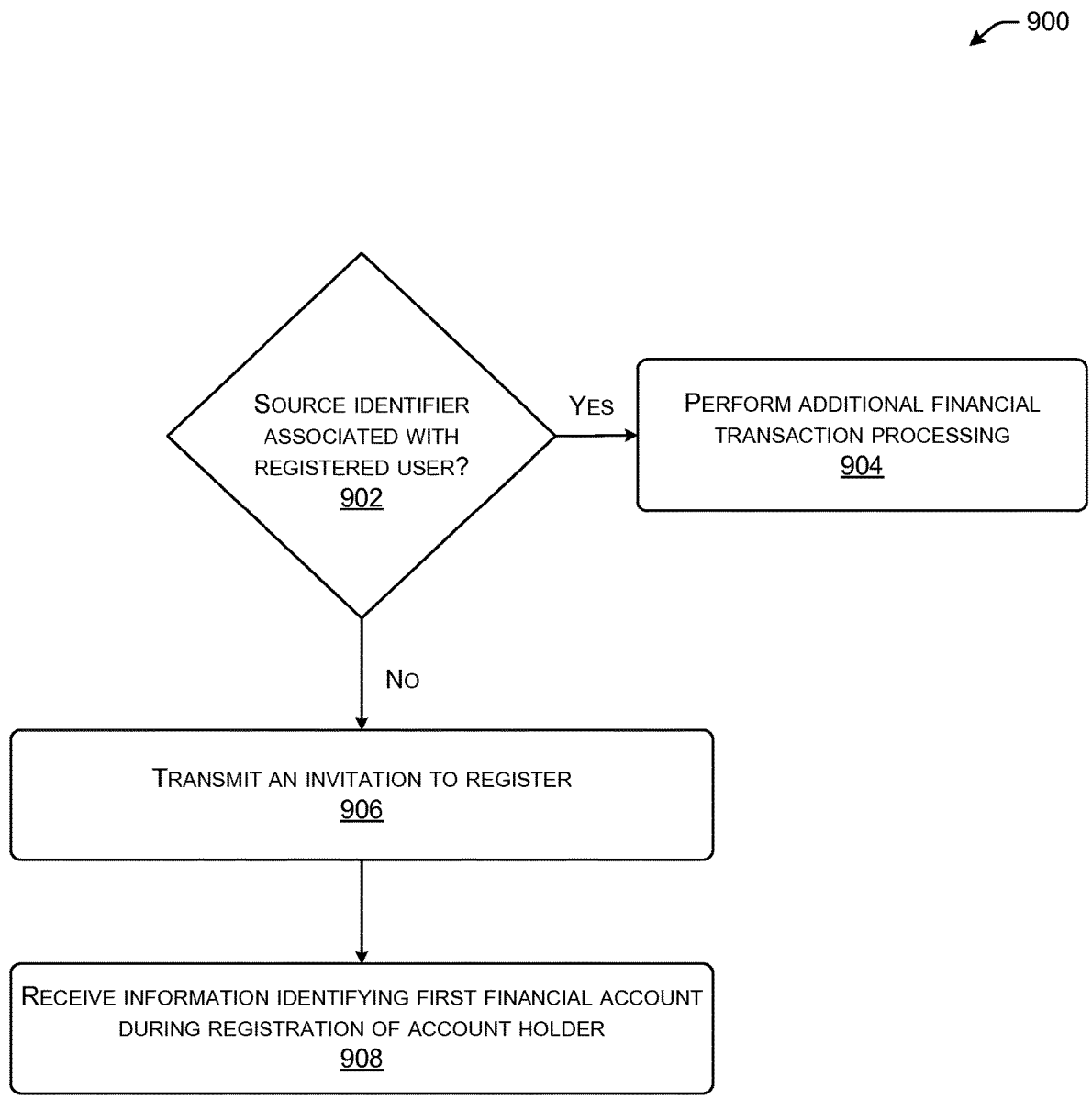
FIG. 9 is a process flow diagram depicting an illustrative method for facilitating registration of an account holder of a financial account to be debited in connection with a financial transaction in accordance with one or more embodiments of the disclosure.

FIGS. 8 and 9 are process flow diagrams that respectively depict illustrative methods 800, 900 for facilitating registration of an account holder of a financial account to be credited and registration of an account holder of a financial account to be debited in connection with a financial transaction in accordance with one or more embodiments of the disclosure.

As described through reference to FIGS. 3A-3B, for example, a request associated with a financial transaction received by the payment system 102 may include second information. The second information may include a target identifier associated with an account holder of the second financial account. Referring to FIG. 9, at decision block 906, a determination may be made as to whether the target identifier is associated with a registered user of the payment system 102. The determination at block 906 may be made, for example, by accessing one or more datastores to determine whether the target identifier corresponds to any of one or more stored identifiers associated with registered users of the payment system 102.

If it is determined that the target identifier is associated with a registered user of the payment system 102, additional processing of the financial transaction may be performed (represented in the aggregate at block 804). The additional processing may include, for example, identification of the second financial account and the second payment network, generation and transmission of debit and credit instructions to the respective payment networks, receipt of a debit status and/or a credit status from the respective payment networks, and so forth.

On the other hand, if it is determined that the target identifier is not associated with a registered user of the payment system 102, the method 800 may proceed to block 806, and an invitation to register with the payment system 102 may be transmitted to, for example, an account holder of the second financial account. The invitation may be transmitted to the target identifier, or in certain embodiments, the target identifier may be used to identify a notification identifier associated with the account holder of the second financial account, and the invitation may be transmitted to the notification identifier. Upon receipt of the invitation to register, the account holder of the second financial account may initiate a registration process for registering with the payment system 102 by, for example, selecting a link provided in association with the invitation. The link may direct the account holder to a user interface supported by the payment system 102 (e.g., a Web interface) for facilitating the registration process. In other embodiments, the invitation may include instructions for initiating the registration process. The account holder may be prompted to download and install one or more client applications supported by the payment system 102 (e.g., any of the client applications 104(1)-104(N)) as part of the registration process.

At block 808, the payment system 102 may receive information identifying the second financial account during registration of the account holder with the payment system 102. More specifically, the account holder may specify the second financial account as a preferred account for financial transactions during registration with the payment system 102. It should be appreciated that numerous variations of the illustrative method 900 are within the scope of this disclosure. For example, the account holder may specify multiple financial accounts during registration with the payment system 102.

Further, as described through reference to FIGS. 3A-3B for example, a request associated with a financial transaction received by the payment system 102 may include first information. In certain embodiments, the first information may include a source identifier associated with an account holder of the first financial account. At decision block 902, a determination may be made as to whether the source identifier is associated with a registered user of the payment system 102. The determination at block 902 may be made, for example, by accessing one or more datastores to determine whether the source identifier corresponds to any of one or more stored identifiers associated with registered users of the payment system 102.

If it is determined that the source identifier is associated with a registered user of the payment system 102, additional processing of the financial transaction may be performed (represented in the aggregate at block 904). The additional processing may include, for example, identification of the first financial account and the first payment network, generation and transmission of debit and credit instructions to the respective payment networks, receipt of a debit status and/or a credit status from the respective payment networks, and so forth.

On the other hand, if it is determined that the source identifier is not associated with a registered user of the payment system 102, the method 900 may proceed to block 906, and an invitation to register with the payment system 102 may be transmitted to, for example, an account holder of the first financial account. The invitation may be transmitted to the source identifier, or in certain embodiments, the source identifier may be used to identify a notification identifier associated with the account holder of the first financial account, and the invitation may be transmitted to the notification identifier.

Upon receipt of the invitation to register, the account holder of the first financial account may initiate a registration process for registering with the payment system 102 by, for example, selecting a link provided in association with the invitation. The link may direct the account holder to a user interface supported by the payment system 102 (e.g., a Web interface) for facilitating the registration process. In other embodiments, the invitation may include instructions for initiating the registration process. The account holder may be prompted to download and install one or more client applications supported by the payment system 102 (e.g., any of the client applications 104(1)-104(N)) as part of the registration process.

At block 908, the payment system 102 may receive information identifying the first financial account during registration of the account holder with the payment system 102. More specifically, the account holder may specify the first financial account as a preferred account for financial transactions during registration with the payment system 102. It should be appreciated that numerous variations of the illustrative method 900 are within the scope of this disclosure. For example, the account holder may specify multiple financial accounts during registration with the payment system 102.

Figure 10:
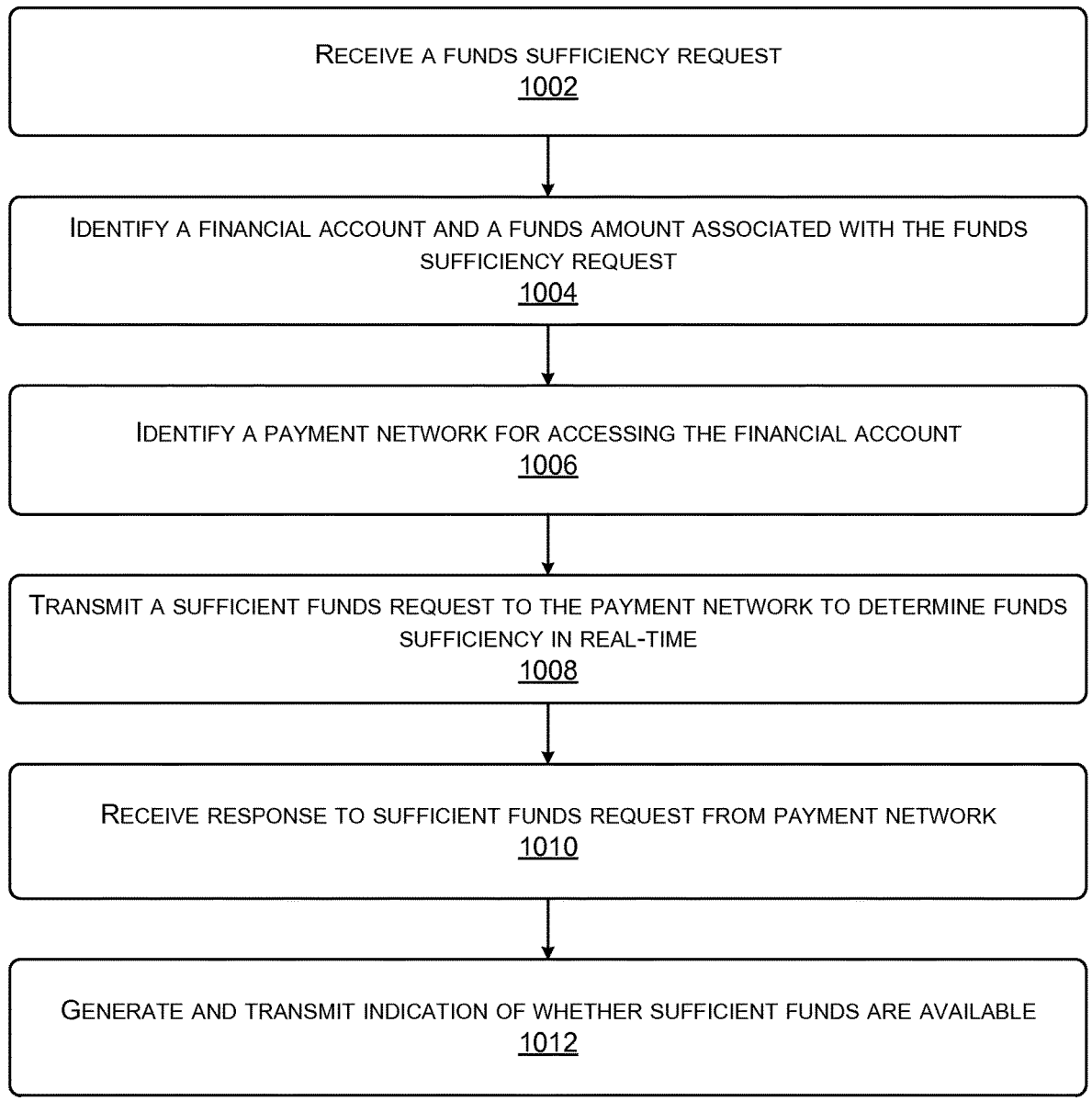
FIG. 10 is a process flow diagram depicting an illustrative method for determining a funds sufficiency in accordance with one or more embodiments of the disclosure.

FIG. 10 is a process flow diagram depicting an illustrative method 1000 for determining funds sufficiency associated with a financial account in accordance with one or more embodiments of the disclosure. At block 1002, a funds sufficiency request may be received by the payment system 102 from a client application (e.g., any of the client applications 104(1)-104(N)), a financial institution, or from any other entity. At block 1004, a financial account and a funds amount associated with the funds sufficiency request may be identified based at least in part on information included in the request. The financial account may be an account to be debited as part of a financial transaction with which the funds sufficiency request is associated. The funds amount identified from the funds sufficiency request may be a funds amount to be debited from the financial account in connection with the financial transaction with which the funds sufficiency request is associated. The financial account may be identified based at least in part on a source identifier associated with an account holder of the financial account and/or an identifier associated with the financial account provided in association with the request.

At block 1006, a payment network that provides access to the financial account may be identified. The payment network may be identified in accordance with any of the mechanisms and/or methodologies described herein. At block 1008, the payment system 102 may transmit a sufficient funds request to the payment network to determine, in real-time, whether a sufficient amount of funds are associated with the financial account to permit a debit of the funds amount from the financial account.

The payment network may support various functionality in various embodiments. In certain embodiments, as described above, a sufficient funds request that identifies the financial account and the funds amount may be transmitted to the payment network, and a corresponding response may be received from the payment network. The sufficient funds request may further include a request to put a hold on the funds for some period of time. In various other embodiments, rather than transmitting a sufficient funds request to the payment network and having the payment network make the determination as to whether sufficient funds are associated with the financial account, the payment system 102 may transmit a request to the payment network for an account balance associated with financial account, and the payment system 102 may perform the sufficient funds determination locally upon receipt of the balance information. If sufficient funds are available, the payment system 102 may optionally transmit another instruction to the payment network to place a hold on the funds for a period of time. In yet other alternative embodiments, the payment system 102 may transmit the instruction to place a hold on the funds for a period of time, and if a response is received from the payment network, this may be taken as an indication that sufficient funds are associated with the financial account.

Assuming that the payment system 102 transmits a sufficient funds request to the payment network at block 1008, then the payment system 102 may receive, from the payment network, a response to the sufficient funds request at block 1010. At block 1012, the payment system 102 may transmit, for potential presentation to the requestor and based at least in part on the response received from the payment network, an indication of whether the financial account has sufficient funds associated therewith to cover a future debit of the funds amount.

The illustrative method 1100 may be performed in connection with any financial transaction including one supported by any of the client applications 104(1)-104(N) or one supported by another payment system, application or mechanism. In certain embodiments, the funds sufficiency request received by the payment system 102 at block 1002 may be associated with a financial transaction such as a paper or other transaction that is processed by an entity or entities other than the payment system 102. In other embodiments, the funds sufficiency request may be associated with a financial transaction that is also being processing by the payment system 102. In such embodiments, the payment system 102 may additionally perform other processing such as risk analysis processing associated with a requestor and/or one or more account holder of financial accounts to which the transaction relates, risk analysis processing associated with the financial transaction, processing to identify financial account(s), identify payment network(s) for accessing the financial account(s), submit debit and/or credit instructions to the identified payment network(s), and so forth. In those embodiments in which the funds sufficiency request is associated with a financial transaction also being processed by the payment system 102, some or all of the risk analysis processing may be performed prior to processing the funds sufficiency request.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, although specific example embodiments have been presented, it should be appreciated that numerous other examples are within the scope of this disclosure.

Additional types of CRSM that may be present in association with any of the components described herein (e.g., any of the components of the networked architecture 100) may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, solid-state memory devices, or any other medium. Combinations of any of the above are also included within the scope of CRSM.

Alternatively, computer-readable communication media may include computer-readable instructions, program modules, or other data transmitted within a data signal, such as a carrier wave, or other transmission. However, as used herein, CRSM does not include computer-readable communication media. Examples of computer-readable communication media, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of embodiments of the disclosure. Conditional language such as, for example, "can," "could," "might," or "may," unless specifically stated otherwise, or unless otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system, comprising:
   one or more computers comprising:
     at least one memory storing computer-executable instructions; and
     at least one processor configured to access the at least one memory and to execute the computer-executable instructions to:
       receive, on behalf of a requestor, a request associated with a financial transaction, wherein the request comprises first information associated with a first financial account at a first financial institution to be debited and second information associated with a second financial account at a second financial institution to be credited;
       identify (i) the first financial account based at least in part on the first information and (ii) the second financial account based at least in part on the second information;
       identify (i) a first payment network and (ii) a second payment network,
         wherein the first financial account and the second financial account are accessible by the system via the first payment network and the second payment network, respectively,
         wherein the first payment network comprises a non-real-time network,
         wherein the first payment network is identified subsequent to failing to identify a third payment network capable of accessing the first account in real time, wherein attempting to identify the third payment network capable of accessing the first account in real time comprises (a) searching one or more datastores associated with the third payment network for an identifier corresponding to at least a portion of an identifier associated with the first financial account, or (b) submitting a request to a service to determine whether the first financial account is accessible in real-time via the third payment network and receiving a response from the service,
         wherein the second payment network comprises a network of financial institutions, including the second financial institution, enabled by a payment processing module respectively provided at or on behalf of each of the financial institutions, and
         wherein the payment processing module provided at or on behalf of the second financial institution (i) comprises a network interaction component configured to communicate with the system in real-time and an integration component configured to communicate with a core account processing system associated with the second financial institution in real-time, and (ii) enables validation of the second financial account prior to transmitting the credit instruction to the second payment network;
       in response to identifying the first payment network, perform a quantitative analysis that generates a measure of a level of risk associated with the financial transaction; and
       in response to a determination that the measure of the level of risk associated with the financial transaction satisfies a threshold level, transmit (i) a debit instruction to the first payment network to post a debit to the first financial account, wherein the debit to the first financial account is not performed in real-time, and (ii) a credit instruction to the second payment network to post a credit to the second financial account in real-time, wherein the debit instruction and the credit instruction are (i) associated with the financial transaction, and (ii) are transmitted substantially simultaneously, and wherein the credit instruction is received by the network interaction component of the payment processing module and the credit is transmitted for posting in the core account processing system by the integration component of the payment processing module.

2. The system of claim 1, wherein the at least one processor is further configured to access the at least one memory and to execute the computer-executable instructions to:
   generate, subsequent to at least one of: (i) transmitting the debit instruction or (ii) transmitting the credit instruction, an indication of one of: (i) a transaction status associated with the financial transaction or (ii) a debit status associated with the debit, or iii) a credit status associated with the credit,
     wherein the transaction status comprises one of: (i) success of the financial transaction or (ii) failure of the financial transaction,
     wherein the debit status comprises one of: (i) successful posting of the debit or (ii) failed posting of the debit, and
     wherein the credit status comprises one of: (i) successful posting of the credit or (ii) failed posting of the credit; and
   transmit, for presentation to the requestor, the indication of one of: (i) the transaction status, (ii) the debit status, or (iii) the credit status.

3. The system of claim 1, wherein the payment processing module forms at least part of a payment processing platform that enables origination and receipt of financial transactions through an Automated Clearinghouse (ACH) network.

4. The system of claim 1, wherein the non-real-time network comprises an Automated Clearinghouse (ACH) network.

5. The system of claim 4, wherein transmission of the debit instruction to the ACH network is enabled by a payment processing platform that enables origination and receipt of financial transactions through the ACH network.

6. The system of claim 1, wherein a settlement of funds associated with the financial transaction is enabled by a payment processing platform that enables origination and receipt of financial transactions through an Automated Clearinghouse (ACH) network.

7. The system of claim 1, wherein the at least one processor is further configured to execute the computer-executable instructions to:
validate at least one of: (i) the first financial account prior to transmitting the debit instruction to the first payment network or (ii) the second financial account prior to transmitting the credit instruction to the second payment network.

8. The system of claim 7, wherein the at least one processor is further configured to execute the computer-executable instructions to validate at least one of: (i) the first financial account or (ii) the second financial account by:
(i) performing a lookup of information stored in the one or more datastores,
(ii) transmitting a respective validation request to the second payment network, or
(iii) transmitting a request for account information the second payment network.

9. The system of claim 7, wherein the payment processing module enables the validation of the second financial account.

10. The system of claim 1, wherein the at least one processor is further configured to execute the computer-executable instructions to:
format the credit instruction to the network of financial institutions in accordance with a particular standard.

11. A method, comprising:
receiving, by a payment system comprising one or more computers and on behalf of a requestor, a request associated with a financial transaction, wherein the request comprises first information associated with a first financial account at a first financial institution to be debited and second information associated with a second financial account at a second financial institution to be credited;
identifying, by the payment system, (i) the first financial account based at least in part on the first information and (ii) the second financial account based at least in part on the second information;
identifying, by the payment system, (i) a first payment network and (ii) a second payment network,
wherein the first financial account and the second financial account are accessible by the payment system via the first payment network and the second payment network, respectively,
wherein the first payment network comprises a non-real-time network,
wherein the first payment network is identified subsequent to failing to identify a third payment network capable of accessing the first account in real time, wherein attempting to identify the third payment network capable of accessing the first account in real time comprises (a) searching one or more datastores associated with the third payment network for an identifier corresponding to at least a portion of an identifier associated with the first financial account, or (b) submitting a request to a service to determine whether the first financial account is accessible in real-time via the third payment network and receiving a response from the service,
wherein the second payment network comprises a network of financial institutions, including the second financial institution, enabled by a payment processing module respectively provided at or on behalf of each of the financial institutions, and
wherein the payment processing module provided at or on behalf of the second financial institution (i) comprises a network interaction component configured to communicate with the system in real-time and an integration component configured to communicate with a core account processing system associated with the second financial institution in real-time, and (ii) enables validation of the second financial account prior to transmitting the credit instruction to the second payment network;
in response to identifying the first payment network, performing, by the payment system, a quantitative analysis that generates a measure of a level of risk associated with the financial transaction; and
in response to a determination that the measure of the level of risk associated with the financial transaction satisfies a threshold level, transmit (i) a debit instruction to the first payment network to post a debit to the first financial account, wherein the debit to the first financial account is not performed in real-time, and (ii) a credit instruction to the second payment network to post a credit to the second financial account in real-time, wherein the debit instruction and the credit instruction are (i) associated with the financial transaction, and (ii) are transmitted substantially simultaneously, and wherein the credit instruction is received by the network interaction component of the payment processing module and the credit is transmitted for posting in the core account processing system by the integration component of the payment processing module.

12. The method of claim 11, further comprising:
generating, by the payment system and subsequent to at least one of: (i) transmitting the debit instruction or (ii) transmitting the credit instruction, an indication of one of: (i) a transaction status associated with the financial transaction or (ii) a debit status associated with the debit, or iii) a credit status associated with the credit,
wherein the transaction status comprises one of: (i) success of the financial transaction or (ii) failure of the financial transaction,
wherein the debit status comprises one of: (i) successful posting of the debit or (ii) failed posting of the debit, and
wherein the credit status comprises one of: (i) successful posting of the credit or (ii) failed posting of the credit; and
transmitting, by the payment system for presentation to the requestor, the indication of one of: (i) the transaction status, (ii) the debit status, or (iii) the credit status.

13. The method of claim 11, wherein the payment processing module forms at least part of a payment processing platform that enables origination and receipt of financial transactions through an Automated Clearinghouse (ACH) network.

14. The method of claim 11, wherein the non-real-time network comprises an Automated Clearinghouse (ACH) network, and wherein transmission of the debit instruction to the ACH network is enabled by a payment processing platform that enables origination and receipt of financial transactions through the ACH network.

* * * * *